US011836995B2

(12) United States Patent
Chen et al.

(10) Patent No.: US 11,836,995 B2
(45) Date of Patent: Dec. 5, 2023

(54) TRAFFIC LIST GENERATION FOR PASSENGER CONVEYANCE

(71) Applicant: OTIS ELEVATOR COMPANY, Farmington, CT (US)

(72) Inventors: Feng Chen, Beijing (CN); Liu Yu, Beijing (CN); Xiangyu Wang, Beijing (CN); Zhen Jia, Shangai (CN); Hui Fang, Shanghai (CN); Arthur Hsu, South Glastonbury, CT (US); Alan Matthew Finn, Chapel Hill, NC (US)

(73) Assignee: Otis Elevator Company, Farmington, CT (US)

( * ) Notice: Subject to any disclaimer, the term of this patent is extended or adjusted under 35 U.S.C. 154(b) by 119 days.

(21) Appl. No.: 17/481,681

(22) Filed: Sep. 22, 2021

(65) Prior Publication Data

US 2022/0004787 A1    Jan. 6, 2022

Related U.S. Application Data

(63) Continuation-in-part of application No. 15/089,625, filed on Apr. 4, 2016, now Pat. No. 11,232,312.

(30) Foreign Application Priority Data

Apr. 3, 2015    (CN) .......................... 201510158110.5

(51) Int. Cl.
*B66B 1/34* (2006.01)
*B66B 1/24* (2006.01)
(Continued)

(52) U.S. Cl.
CPC ............ *G06V 20/59* (2022.01); *B66B 1/2408* (2013.01); *B66B 1/3476* (2013.01); *B66B 3/02* (2013.01);
(Continued)

(58) Field of Classification Search
CPC ................................. B66B 1/2408; B66B 1/00
See application file for complete search history.

(56) References Cited

U.S. PATENT DOCUMENTS 3,219,151 A    11/1965 Henker
3,556,256 A    1/1971 Sprague
(Continued)

FOREIGN PATENT DOCUMENTS

AU                  760298 B2    5/2003
CN                 1625524 A    6/2005
(Continued)

OTHER PUBLICATIONS

Extended European Search Report dated Jun. 29, 2022 for corresponding European Application 22156868.6.
(Continued)

*Primary Examiner* — Kyle M Lotfi
(74) *Attorney, Agent, or Firm* — Bachman & LaPointe, P.C.

(57) ABSTRACT

A passenger tracking system includes a multiple of sensors for capturing depth map data of objects. A processing module in communication with the multiple of sensors to receive the depth map data, the processing module uses the depth map data to track an object and calculate passenger data associated with the tracked object to generate a passenger tracking list that tracks each individual passenger in the passenger data from an origin lobby to a destination lobby and through an in-car track between the origin lobby and the destination lobby.

23 Claims, 24 Drawing Sheets

(51) Int. Cl.
  *B66B 3/02* (2006.01)
  *B66B 5/00* (2006.01)
  *G06V 20/59* (2022.01)
  *G06T 7/50* (2017.01)
  *G06V 40/10* (2022.01)
  *G01C 3/08* (2006.01)

(52) U.S. Cl.
  CPC .............. *B66B 5/0012* (2013.01); *G01C 3/08* (2013.01); *G06T 7/50* (2017.01); *G06V 40/103* (2022.01)

(56) References Cited

U.S. PATENT DOCUMENTS

| | | | |
|---|---|---|---|
| 4,299,309 | A | 11/1981 | Bittar et al. |
| 4,939,679 | A | 7/1990 | David et al. |
| 5,168,136 | A | 12/1992 | Thangavelu et al. |
| 5,258,586 | A | 11/1993 | Suzuki et al. |
| 5,298,697 | A | 3/1994 | Suzuki et al. |
| 5,345,049 | A | 9/1994 | Bahjat et al. |
| 5,387,768 | A | 2/1995 | Izard et al. |
| 5,487,451 | A | 1/1996 | Hughes et al. |
| 6,304,257 | B1 | 10/2001 | Viskari |
| 6,339,375 | B1 | 1/2002 | Hirata et al. |
| 6,386,325 | B1 | 5/2002 | Fujita |
| 6,707,374 | B1 | 3/2004 | Zaharia |
| 6,973,998 | B2 | 12/2005 | Deplazes et al. |
| 7,031,525 | B2 | 4/2006 | Beardsley |
| 7,079,669 | B2 | 7/2006 | Hashimoto et al. |
| 7,140,469 | B2 | 11/2006 | Deplazes et al. |
| 7,382,895 | B2 | 6/2008 | Bramblet et al. |
| 7,397,929 | B2 | 7/2008 | Nichani et al. |
| 7,529,646 | B2 | 5/2009 | Lin et al. |
| 7,712,586 | B2 | 5/2010 | Legez |
| 7,889,193 | B2 | 2/2011 | Platonov et al. |
| 7,920,718 | B2 | 4/2011 | Marrion et al. |
| 7,936,249 | B2 | 5/2011 | Friedli |
| 8,020,672 | B2 | 9/2011 | Lin et al. |
| 8,061,485 | B2 | 11/2011 | Finschi |
| 8,189,943 | B2 | 5/2012 | Yea et al. |
| 8,260,042 | B2 | 9/2012 | Peng et al. |
| 8,584,811 | B2 | 11/2013 | Kuoppala et al. |
| 8,660,700 | B2 | 2/2014 | Jia et al. |
| 8,857,569 | B2 | 10/2014 | Friedli |
| 8,939,263 | B2 | 1/2015 | Tokura |
| 8,944,219 | B2 | 2/2015 | Gerstenkorn |
| 8,960,373 | B2 | 2/2015 | De Vincentis |
| 9,079,749 | B2 | 7/2015 | Hsieh |
| 9,079,751 | B2 | 7/2015 | Sundholm et al. |
| 9,323,232 | B2 | 4/2016 | Blom et al. |
| 9,365,393 | B2 | 6/2016 | Salmikuukka et al. |
| 9,481,548 | B2 | 11/2016 | Siddiqui et al. |
| 9,661,245 | B2 | 5/2017 | Kawano |
| 9,896,303 | B2 | 2/2018 | Freeman et al. |
| 9,957,132 | B2 | 5/2018 | Berryhill |
| 9,988,238 | B2 | 6/2018 | Simcik et al. |
| 10,005,639 | B2 | 6/2018 | Wang et al. |
| 2002/0100646 | A1 | 8/2002 | Maurice et al. |
| 2003/0107649 | A1 | 6/2003 | Flickner et al. |
| 2005/0088520 | A1* | 4/2005 | Wiesinger ............ B66B 29/005 348/42 |
| 2005/0093697 | A1 | 5/2005 | Nichani et al. |
| 2005/0173200 | A1 | 8/2005 | Cook et al. |
| 2006/0037818 | A1 | 2/2006 | Deplazes et al. |
| 2006/0126738 | A1 | 6/2006 | Boice et al. |
| 2007/0073477 | A1 | 3/2007 | Krumm et al. |
| 2007/0122001 | A1 | 5/2007 | Wang et al. |
| 2007/0182739 | A1 | 8/2007 | Platonov et al. |
| 2009/0208067 | A1 | 8/2009 | Peng et al. |
| 2012/0020518 | A1 | 1/2012 | Taguchi |
| 2012/0083705 | A1 | 4/2012 | Yuen et al. |
| 2012/0087573 | A1 | 4/2012 | Sharma et al. |
| 2012/0169887 | A1 | 7/2012 | Zhu et al. |
| 2013/0038694 | A1 | 2/2013 | Nichani et al. |
| 2013/0075201 | A1 | 3/2013 | Lee et al. |
| 2013/0182905 | A1 | 7/2013 | Myers et al. |
| 2013/0242074 | A1 | 9/2013 | Sekiguchi et al. |
| 2013/0297093 | A1 | 11/2013 | Nowel |
| 2014/0028842 | A1 | 1/2014 | Abramson et al. |
| 2014/0314278 | A1 | 10/2014 | Tatsuzawa et al. |
| 2015/0073748 | A1 | 3/2015 | Mattsson et al. |
| 2015/0091900 | A1 | 4/2015 | Yang et al. |
| 2015/0239708 | A1 | 8/2015 | Palazzola et al. |
| 2015/0312498 | A1 | 10/2015 | Kawano |
| 2016/0031675 | A1 | 2/2016 | Silvennoinen et al. |
| 2016/0194181 | A1 | 7/2016 | Wang et al. |
| 2016/0289042 | A1 | 10/2016 | Fang et al. |
| 2016/0289043 | A1 | 10/2016 | Fang et al. |
| 2016/0289044 | A1 | 10/2016 | Hsu et al. |
| 2016/0292515 | A1 | 10/2016 | Jia et al. |
| 2016/0292521 | A1 | 10/2016 | Fang et al. |
| 2016/0292522 | A1 | 10/2016 | Chen et al. |
| 2016/0295196 | A1 | 10/2016 | Finn et al. |
| 2016/0297642 | A1 | 10/2016 | Finn et al. |
| 2016/0368732 | A1 | 12/2016 | Zhao et al. |
| 2017/0081148 | A1* | 3/2017 | Salmikuukka ........ B66B 1/3407 |
| 2017/0091561 | A1* | 3/2017 | Pham .................... G06V 40/20 |
| 2017/0292836 | A1 | 10/2017 | Jia et al. |
| 2017/0302909 | A1 | 10/2017 | Finn et al. |
| 2017/0327344 | A1 | 11/2017 | Richmond et al. |
| 2018/0018508 | A1 | 1/2018 | Tusch |

FOREIGN PATENT DOCUMENTS

| | | | |
|---|---|---|---|
| CN | 102311021 | A | 1/2012 |
| CN | 104271483 | A | 1/2015 |
| EP | 1110899 | A1 | 6/2001 |
| EP | 1345445 | A1 | 9/2003 |
| EP | 2116499 | A1 | 11/2009 |
| EP | 2154653 | A1 | 2/2010 |
| EP | 2295361 | A1 | 3/2011 |
| EP | 2316777 | A1 | 5/2011 |
| EP | 2907783 | A1 | 8/2015 |
| GB | 2479495 | A | 10/2011 |
| JP | 2004338891 | A | 12/2004 |
| JP | 2005126184 | A | 5/2005 |
| JP | 2005255244 | A | 9/2005 |
| JP | 2005255274 | A | 9/2005 |
| JP | 2005306584 | A | 11/2005 |
| JP | 2008120548 | A | 5/2008 |
| JP | 2008127158 | A | 6/2008 |
| JP | 4135674 | B2 | 8/2008 |
| JP | 2009143722 | A | 7/2009 |
| JP | 2010063001 | A | 3/2010 |
| JP | 2012166929 | A * | 9/2012 |
| JP | 2012218912 | A | 11/2012 |
| JP | 2013173594 | A | 9/2013 |
| JP | 2013230922 | A | 11/2013 |
| JP | 2014021816 | A | 2/2014 |
| JP | 2014131932 | A | 7/2014 |
| WO | 2007081345 | A1 | 7/2007 |
| WO | 2009031376 | A1 | 3/2009 |
| WO | 2014122357 | A1 | 8/2014 |
| WO | 2015/023278 | A1 | 2/2015 |
| WO | 2015023278 | A1 | 2/2015 |

OTHER PUBLICATIONS

Michael Hary et al: "Sensor fusion", Apr. 1, 2015, XP055296423, https://en.wikipedia.org/w/index.php?title=Special:Book&bookcmd=download&collection_id=af22a0b3454c96a40ab574dd5ab3e2cfbedlla8d&writer=rdf2latex&return_to=Sensor+fusion.

Sebastian Thrun and John J. Leonard, Simultaneous Localization and Mapping, Springer Handbook of Robotics, 2008, pp. 871-889.

Julien Mairal, Francis Bach and Jean Ponce, Online dictionary learning for sparse coding, ICML 2009.

Abate, A.F., Nappi, M., Riccio, D., and Sabation, G., "2D and 3D face recognition: A survey, "Pattern Recognition Letters, v.28 (2007), pp. 1885-1906.

(56) References Cited

OTHER PUBLICATIONS

Chen Change Loy, Ke Chen, Shaogang Gong, and Tao Xiang, "Crown Counting and Profiling: Methodology and Evaluation", In Modeling, Simulation, and Visual Analysis of Large Crowds, Springer 2013.
Jonathan Ruttle, Claudia Arellano and Rozenn Dahyot, Extrinsic: Camera Parameters Estimation for Shape-From-Depths. 20th European Signal Processing Conference (EUSIPCO 2012), Bucharest, Romania Aug. 27-31, 2012. pp. 1985-1989.
Alper Yilmaz, Omar Javed, Mubarak Shah. Object tracking: A survey, ACM Computing Surveys (CSUR), vol. 38, Issue 4, 2006, Article No. 13.
P.F. Felzenszwalb, et al., Object detection with Discriminatively Trained Part Based Models, PAMI 2010.
Tao Zhao et al., Segmentation and Tracking of Multiple Humans in Crowded Environments, PAMI 2008.
Smith Towerinterior—Lobby 2008.
Wikipedia—Elevator Operator, Retrieved from "https://en.wikipedia.org/w/index.php?title=Elevator_operator&oldid=960123891".
T. Taipalus et al., Human detection and tracking with knee-high mobile 2D LIDAR, 2011 IEEE International Conference on Robotics and Biometrics.
R. Dominguez et al., LIDAR based perception solution for autonomous vehicles, 2011 International Conference on Intelligent Systems Design and Applications.
Chris Stauffer et al., Adaptive background mixture models for real-time tracking, CVPR, 1999.
Dmitry Chetverikov et al., Dynamic texture as foreground and background, Machine Vision and Applications, 2011.
Dorin Comaniciu et al., Real-Time Tracking of Non-rigid Objects Using Mean Shift, CVPR, 2000.
Yoshua Bengio, Learning Deep Architectures for AI, Foundations and Trends in Machine Learning, 2009.
Ross, A., "An Introduction To Multibiometrics", EUSIPCO 2007, Poznan, Poland, Sep. 3-7, 2007.
ICD Security Solutions, "Security in 3D: a closer look at "Time of Flight" technology", cited Oct. 24, 2014.
Foix, et al., "Lock-in-Time-of-Flight (ToF) Cameras: A Survey", IEEE Sensors, Journal, vol. 11, No. 3, Mar. 2011.
Jonker, "Morphological Operations on 3D and 4D Images: from Shape Primitive Detection to Skeletonization", Springer Vertag 2000.

* cited by examiner

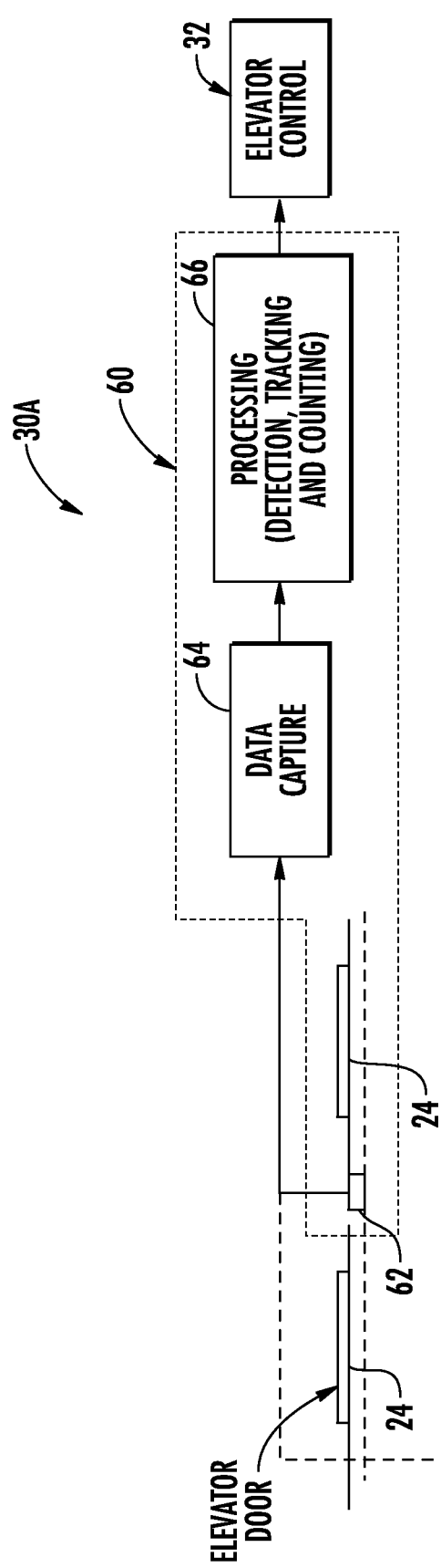
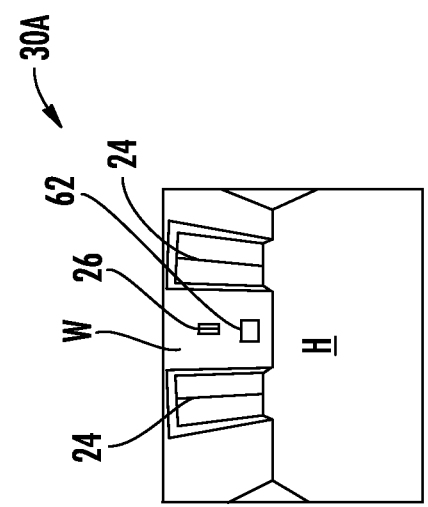
FIG. 2
FIG. 3

| ID | ARRIVAL TIME | ORIGINAL FLOOR | BOARDING TIME | CAR NUMBER | DEBOARDING TIME | DESTINATION FLOOR | DEPARTURE TIME |
|---|---|---|---|---|---|---|---|
| 10 | 00:01:43 | 8 | — | — | — | 8 | 00:01:45 |
| 11 | 00:01:45 | 2 | 00:01:55 | 2 | 00:02:31 | 8 | 00:02:36 |
| 12 | 00:01:43 | 2 | 00:01:53 | 2 | 00:02:31 | 8 | 00:02:35 |
| 13 | 00:02:15 | 6 | 00:02:51 | 1 | 00:03:23 | 2 | 00:03:27 |
| 14 | 00:02:17 | 6 | 00:02:53 | 1 | 00:03:24 | 2 | 00:03:28 |
| 15 | 00:03:10 | 4 | 00:03:56 | 1 | 00:04:28 | 9 | 00:04:31 |
| 16 | 00:04:12 | 3 | — | — | — | 3 | 00:04:15 |
| 17 | 00:04:15 | 8 | 00:04:51 | 1 | 00:05:30 | 2 | 00:05:34 |
| 18 | 00:04:16 | 2 | 00:04:23 | 2 | 00:04:52 | 6 | 00:04:58 |
| 19 | 00:04:17 | 8 | 00:04:52 | 1 | 00:05:30 | 2 | 00:05:34 |

TRAFFIC LIST

FIG. 20

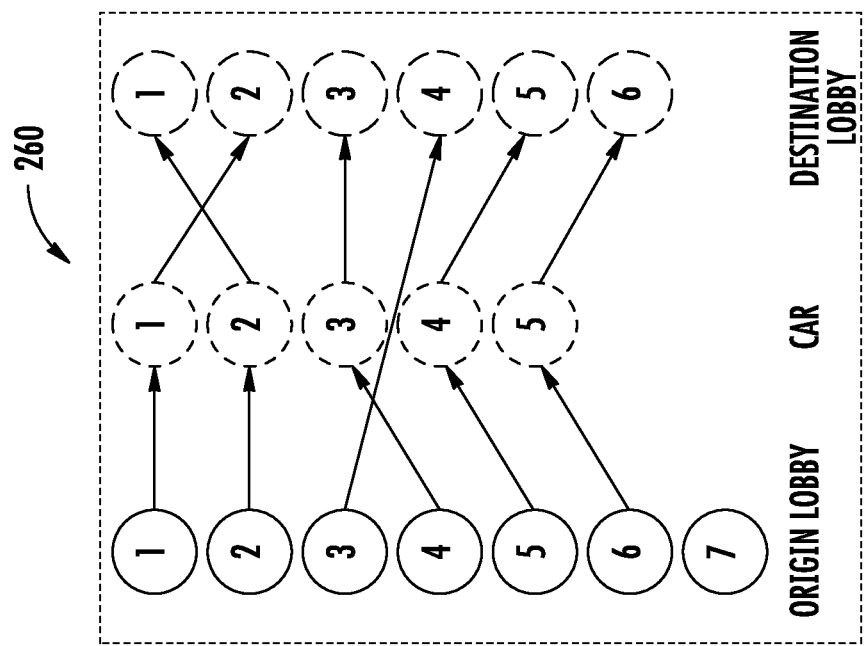
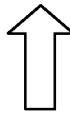
WEIGHTED BY ORDER AND TIME DIFFERENCE; FIND THE BEST PATHS
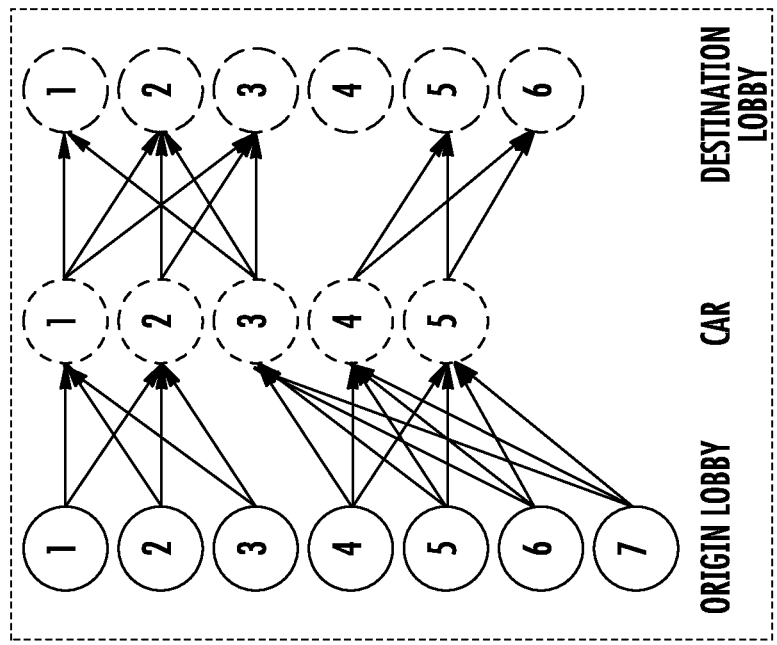
FIG. 22

TRAFFIC LIST GENERATION FOR PASSENGER CONVEYANCE

CROSS-REFERENCE TO RELATED APPLICATIONS

This application is a continuation-in-part of U.S. patent application Ser. No. 15/089,625, filed Apr. 4, 2016, which claims priority of CN 201510158110.5, filed Apr. 3, 2015.

BACKGROUND

The present disclosure relates to a passenger conveyance and, more particularly, to a depth sensor based control for an elevator.

Elevator performance can be derived from a number of factors. To an elevator passenger, an important factor can include travel time. For example, as time-based parameters are minimized, passenger satisfaction with the service of the elevator can improve. Modern elevator systems may still provide opportunities for improved passenger experience and traffic performance.

Typically, in a building with many people inside, efficient elevator usage may be complicated since certain time periods may by high traffic times, while others will be low traffic which may create inconvenience and delay for users, both those in the car and those waiting for a car.

Modern elevator systems may still provide opportunities for improved passenger experience and traffic performance.

SUMMARY

A passenger tracking system according to one disclosed non-limiting embodiment of the present disclosure can include one or more sensors for capturing sensor data; and a processing module in communication with the one or more sensors to receive the sensor data, where the processing module uses the sensor data to track an object and calculate passenger data associated with the tracked object to generate a passenger tracking list that tracks a passenger in the sensor data from an origin conveyance lobby to a destination conveyance lobby.

A further embodiment of the present disclosure may include, wherein at least one of the one or more sensors for capturing sensor data is located in a conveyance lobby adjacent to a conveyance system.

A further embodiment of any of the foregoing embodiments of the present disclosure may include, wherein at least one of the one or more sensors for capturing sensor data is located in a conveyance passenger enclosure.

A further embodiment of any of the foregoing embodiments of the present disclosure may include, wherein the sensor data is at least one of 2D and 3D depth data from a depth-sensing sensor.

A further embodiment of any of the foregoing embodiments of the present disclosure may include, wherein the depth-sensing sensor comprises a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, scanning LIDAR, flash LIDAR, Passive Infrared (PIR) sensor, and small Focal Plane Array (FPA), or a combination comprising at least one of the foregoing.

A further embodiment of any of the foregoing embodiments of the present disclosure may include, wherein the processing module calculates an object parameter of the tracked object, wherein the object parameter comprises an object count, a location, a size, a direction, an acceleration, a velocity, an object classification, or a combination comprising at least one of the foregoing.

A further embodiment of any of the foregoing embodiments of the present disclosure may include, wherein the processing module calculates the passenger data if the tracked object is classified as a passenger.

A further embodiment of any of the foregoing embodiments of the present disclosure may include, wherein a passenger is tracked in at least one of an origin conveyance lobby, a conveyance passenger enclosure, a destination conveyance lobby.

A further embodiment of any of the foregoing embodiments of the present disclosure may include, wherein a passenger is tracked by two trackers when within the respective lobby.

A further embodiment of any of the foregoing embodiments of the present disclosure may include, wherein the two trackers include a head-shoulder tracker and a body tracker.

A further embodiment of any of the foregoing embodiments of the present disclosure may include, wherein the head-shoulder tracker is based on online boosting and the body tracker is based on particle filtering.

A further embodiment of any of the foregoing embodiments of the present disclosure may include, wherein a unique passenger identity is maintained during a passenger transition from at least one of an origin conveyance lobby to a conveyance passenger enclosure and a conveyance passenger enclosure to a destination conveyance lobby.

A method of passenger tracking for a passenger conveyance system, the method according to another disclosed non-limiting embodiment of the present disclosure can include tracking an individual passenger in an origin conveyance lobby; tracking the individual passenger while within a conveyance passenger enclosure from the origin conveyance lobby; and tracking the individual passenger from the conveyance passenger enclosure into a destination conveyance lobby to generate a traffic list.

A further embodiment of any of the foregoing embodiments of the present disclosure may include, wherein the tracking is performed using sensor data from a sensor in the conveyance passenger enclosure.

A further embodiment of any of the foregoing embodiments of the present disclosure may include tracking the individual passenger while in the conveyance passenger enclosure.

A further embodiment of any of the foregoing embodiments of the present disclosure may include tracking the head of each individual passenger.

A further embodiment of any of the foregoing embodiments of the present disclosure may include detection the head of each individual passenger via a circle-Hough transform and tracking the head via particle filtering.

A further embodiment of any of the foregoing embodiments of the present disclosure may include adjusting the head detection result to enclose each individual passenger based on optical flow.

A further embodiment of any of the foregoing embodiments of the present disclosure may include, wherein at least one of tracking the individual passenger while within a conveyance passenger enclosure from the origin conveyance lobby and tracking the individual passenger from the conveyance passenger enclosure into a destination conveyance lobby comprises a tracking hand over approach.

A further embodiment of any of the foregoing embodiments of the present disclosure may include edge weighting a graph-based optimization.

A further embodiment of any of the foregoing embodiments of the present disclosure may include edge weighting by order and time difference.

A further embodiment of any of the foregoing embodiments of the present disclosure may include, wherein at least one of tracking the individual passenger while within a conveyance passenger enclosure from the origin conveyance lobby and tracking the individual passenger from the conveyance passenger enclosure into a destination conveyance lobby to generate a traffic list comprises conveyance passenger enclosure door open/close identification.

A further embodiment of any of the foregoing embodiments of the present disclosure may include combining a multiple of traffic lists for each individual passenger over time.

A further embodiment of any of the foregoing embodiments of the present disclosure may include combining a multiple of traffic lists for each of a multiple of individual passenger over time with time as a parameter to facilitate statistical distribution determination of usage for an entire building.

A further embodiment of any of the foregoing embodiments of the present disclosure may include combining a multiple of traffic lists for each of a multiple of individual passenger over time with time as a parameter to facilitate statistical distribution determination of usage for a geographic area.

A further embodiment of any of the foregoing embodiments of the present disclosure may include combining a multiple of traffic lists for each of a multiple of individual passengers over time with time as a parameter to facilitate statistical distribution determination of usage for daily load estimation.

A further embodiment of any of the foregoing embodiments of the present disclosure may include combining a multiple of traffic lists for each of a multiple of individual passenger over time with time as a parameter to facilitate statistical distribution determination of usage for system diagnostics.

In a further embodiment of any of the foregoing embodiments, the method can further comprise identifying the specific door that the passenger entered in an elevator that has multiple doors and including the entrance door information in the generated information for the passenger transition.

In a still further embodiment of any of the foregoing embodiments, the method can further comprise identifying the specific door that the passenger exited from an elevator that has multiple doors and including the exit door information in the generated information for the passenger transition.

The foregoing features and elements may be combined in various combinations without exclusivity, unless expressly indicated otherwise. These features and elements as well as the operation thereof will become more apparent in light of the following description and the accompanying drawings. It should be appreciated, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 2 is a block diagram of an elevator system according to another disclosed non-limiting embodiment;

FIG. 3 is a perspective view of an elevator system according to another disclosed non-limiting embodiment;

FIG. 20 is a block diagram of a table for an elevator system according to another disclosed non-limiting embodiment;

FIG. 22 is a graphical representation for passenger tracking from an origin lobby to a destination lobby via in-car tracking;

DETAILED DESCRIPTION

Figure 1:
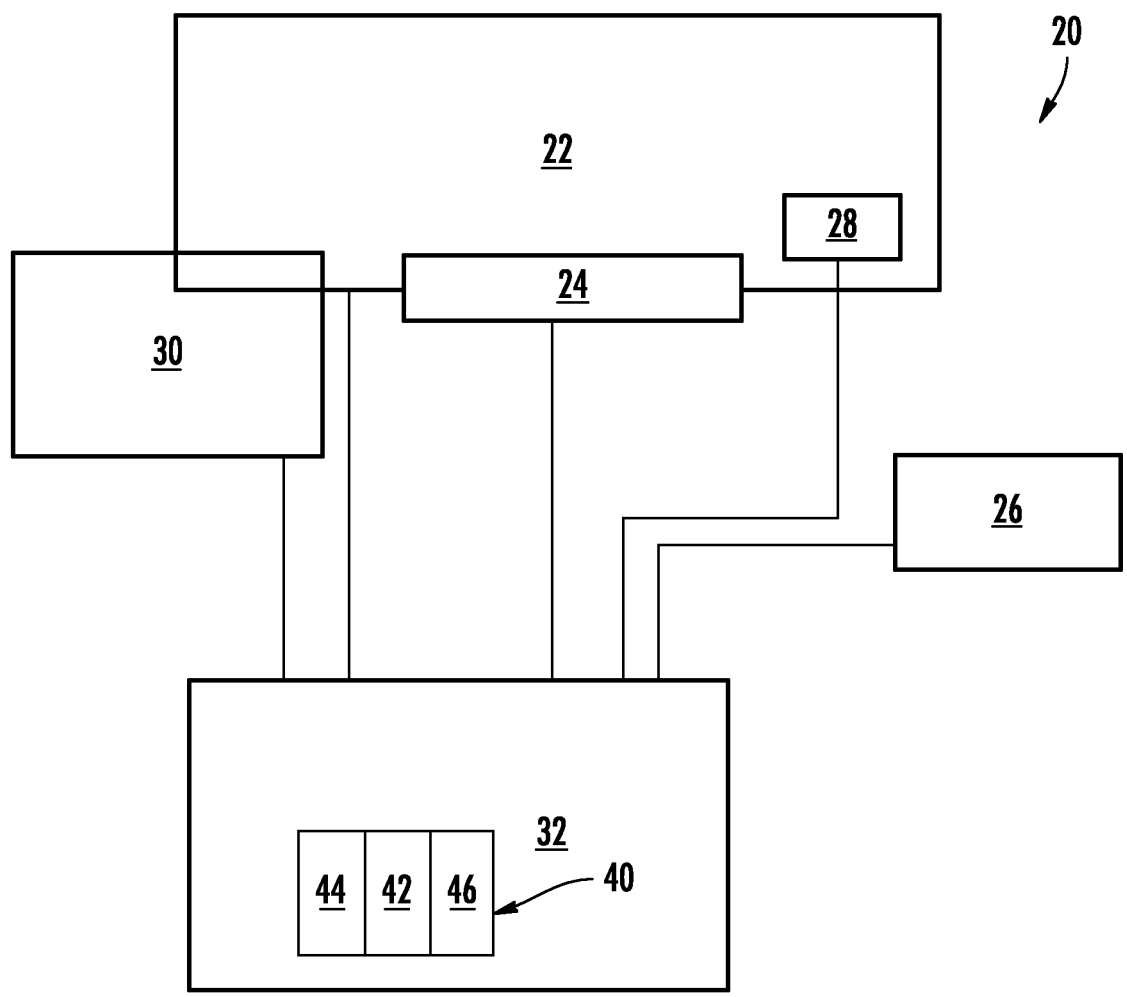
FIG. 1 is a schematic view of an elevator system according to one disclosed non-limiting embodiment.

FIG. 1 schematically illustrates a passenger conveyance system 20 such as an elevator system. The system 20 can include an elevator car 22, an elevator door 24, a lobby call 26, a car-operating panel (COP) 28, a sensor system 30, and a control system 32. It should be appreciated that although an elevator system is disclosed and illustrated as an example herein, other passenger conveyance systems such as mass transit vehicles will also benefit herefrom. It should be further appreciated that although particular systems are separately defined, each or any of the systems may be otherwise combined or separated via hardware and/or software.

The overall amount of travel time a passenger associates with elevator performance may include three time intervals. A first time interval can be the amount of time a passenger waits in a lobby for an elevator to arrive, hereafter the "wait time." A second time interval can be the "door dwell time" or the amount of time the elevator doors are open, allowing passengers to enter or leave the elevator. A third time interval can be the "ride time" or amount of time a passenger spends in the elevator. The ride time can also include a stop on an intermediate floor to allow passengers to enter and/or exit the elevator which can add to the ride time by at least the door dwell time during the stop.

Various elevator systems can utilize a passenger-initiated input to signal the need for service. For example, input from the lobby call 26 may include a push button, e.g., up, down, or desired destination, to request elevator service. The passenger initiated input (e.g., via a call button) may notify the control system 32 of the presence of a passenger awaiting elevator service. In response, the control system 32 may dispatch the elevator car 22 to the appropriate floor. Optionally, once inside the elevator car 22, the passenger may push a button on the car-operating panel (COP) 28 designating the desired destination, direction, or the like, and then the control system 32 may dispatch the elevator car 22 to that destination.

The control system 32 can include a control module 40 with a processor 42, a memory 44, and an interface 46. The control module 40 can include a portion of a central control, a stand-alone unit, or other system such as a cloud-based system. The processor 42 can include any type of microprocessor having desired performance characteristics. The memory 44 may include any type of computer readable medium that stores the data and control processes disclosed herein. That is, the memory 44 is an example computer storage media that can have embodied thereon computer-usable instructions such as a process that, when executed, can perform a desired method. The interface 46 of the control module 40 can facilitate communication between the control module 40 and other systems.

With reference to FIG. 2, a depth-sensor based passenger sensing system 60 can include a sensor 62 that communicates with a data capture module 64, and a processing module 66. The depth-sensor based passenger sensing system 60 can be a portion of the control system 32, a stand-alone unit, or other system such as a cloud-based system in communication with the control system 32. The data capture module 64, and the processing module 66 can be particular to the sensor 62 to acquire and process the data therefrom. In one example, the sensor 62, through the data capture module 64 and the processing module 66, is operable to obtain depth map data such as the presence of a passenger in a passenger waiting area or lobby H, an estimated time of arrival (ETA) of the passenger, a number of passengers in the lobby H, etc.

The sensor 62, according to one disclosed non-limiting embodiment, can be installed in a lower portion of wall W of the lobby H such as at knee height (FIG. 3). The sensor 62 in this disclosed non-limiting embodiment includes a depth-sensing sensor. It should be appreciated that the term "sensor," is used throughout this disclosure for any 1D, 2D, or 3D depth sensor, or combination thereof. Such a sensor can be operable in the optical, electromagnetic or acoustic spectrum capable of producing a depth map (also known as a point cloud or occupancy grid) of the corresponding dimension(s). Various depth sensing sensor technologies and devices include, but are not limited to, a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, scanning LIDAR, flash LIDAR, Passive Infrared (PR) sensor, and small Focal Plane Array (FPA), or a combination comprising at least one of the foregoing. Different technologies can include active (transmitting and receiving a signal) or passive (only receiving a signal) and may operate in a band of the electromagnetic or acoustic spectrum such as visual, infrared, etc. The use of depth sensing can have specific advantages over conventional 2D imaging. The use of infrared sensing can have specific benefits over visible spectrum imaging such that alternatively, or additionally, the sensor can be an infrared sensor with one or more pixels of spatial resolution, e.g., a Passive Infrared (PIR) sensor or small IR Focal Plane Array (FPA).

Notably, there can be qualitative and quantitative differences between 2D imaging sensors, e.g., conventional security cameras, and 1D, 2D, or 3D depth sensing sensors to the extent that the depth-sensing provides numerous advantages. In 2D imaging, the reflected color (mixture of wavelengths) from the first object in each radial direction from the imager is captured. The 2D image, then, can include the combined spectrum of the source illumination and the spectral reflectivity of objects in the scene. A 2D image can be interpreted by a person as a picture. In 1D, 2D, or 3D depth-sensing sensors, there is no color (spectral) information; rather, the distance (depth, range) to the first reflective object in a radial direction (1D) or directions (2D, 3D) from the sensor is captured. 1D, 2D, and 3D technologies may have inherent maximum detectable range limits and can be of relatively lower spatial resolution than typical 2D imagers. The use of 1D, 2D, or 3D depth sensing can advantageously provide improved operations compared to conventional 2D imaging in their relative immunity to ambient lighting problems, better separation of occluding objects, and better privacy protection. The use of infrared sensing can have specific benefits over visible spectrum imaging. For example, a 2D image may not be able to be converted into a depth map nor may a depth map have the ability to be converted into a 2D image (e.g., an artificial assignment of contiguous colors or grayscale to contiguous depths may allow a person to crudely interpret a depth map somewhat akin to how a person sees a 2D image, it is not an image in the conventional sense.). This inability to convert a depth map into an image might seem a deficiency, but it can be advantageous in certain analytics applications disclosed herein.

The sensor 62 can be, in one example, an eye-safe line-scan LIDAR in which the field-of-view (FOV) can be, for example, about 180 degrees, which can horizontally cover the entire area of a lobby or other passenger area adjacent to the elevator doors 24 (FIG. 2). The output of the LIDAR may, for example, be a 2D horizontal scan of the surrounding environment at a height where the sensor 62 is installed. For an active sensor, each data point in the scan represents the reflection of a physical object point in the FOV, from which range and horizontal angle to that object point can be obtained. The scanning rate of LIDAR can be, for example, 50 ms per scan, which can facilitate a reliable track of a passenger. That is, before application of analytic processes via the processing module 66, the LIDAR scan data can be converted to an occupancy grid representation. Each grid represents a small region, e.g., 5 cm×5 cm. The status of the grid can be indicated digitally, e.g., 1 or 0, to indicate whether each grid square is occupied. Thus, each data scan can be converted to a binary map and these maps then used to learn a background model of the lobby, e.g. by using processes designed or modified for depth data such as a Gaussian Mixture Model (GMM) process, principal component analysis (PCA) process, a codebook process, or a combination including at least one of the foregoing.

The processing module 66 may utilize various 3D detection and tracking processes (disclosed elsewhere herein) such as background subtraction, frame differencing, and/or spurious data rejection that can make the system more resistant to spurious data. Such spurious data can be inherent to depth sensing and may vary with the particular technology employed. For active techniques, where a particular signal is emitted and subsequently detected to determine depth (e.g., structured light, time of flight, LIDAR, and the like) highly reflective surfaces may produce spurious depth data, e.g., not the depth of the reflective surface itself, but of a diffuse reflective surface at a depth that is the depth to the reflective surface plus the depth from the reflective surface to some diffusely reflective surface. Highly diffuse surfaces may not reflect a sufficient amount of the transmitted signal to determine depth that may result in spurious gaps in the depth map. Even further, variations in ambient lighting, interference with other active depth sensors or inaccuracies in the signal processing may result in spurious data.

Figure 4:
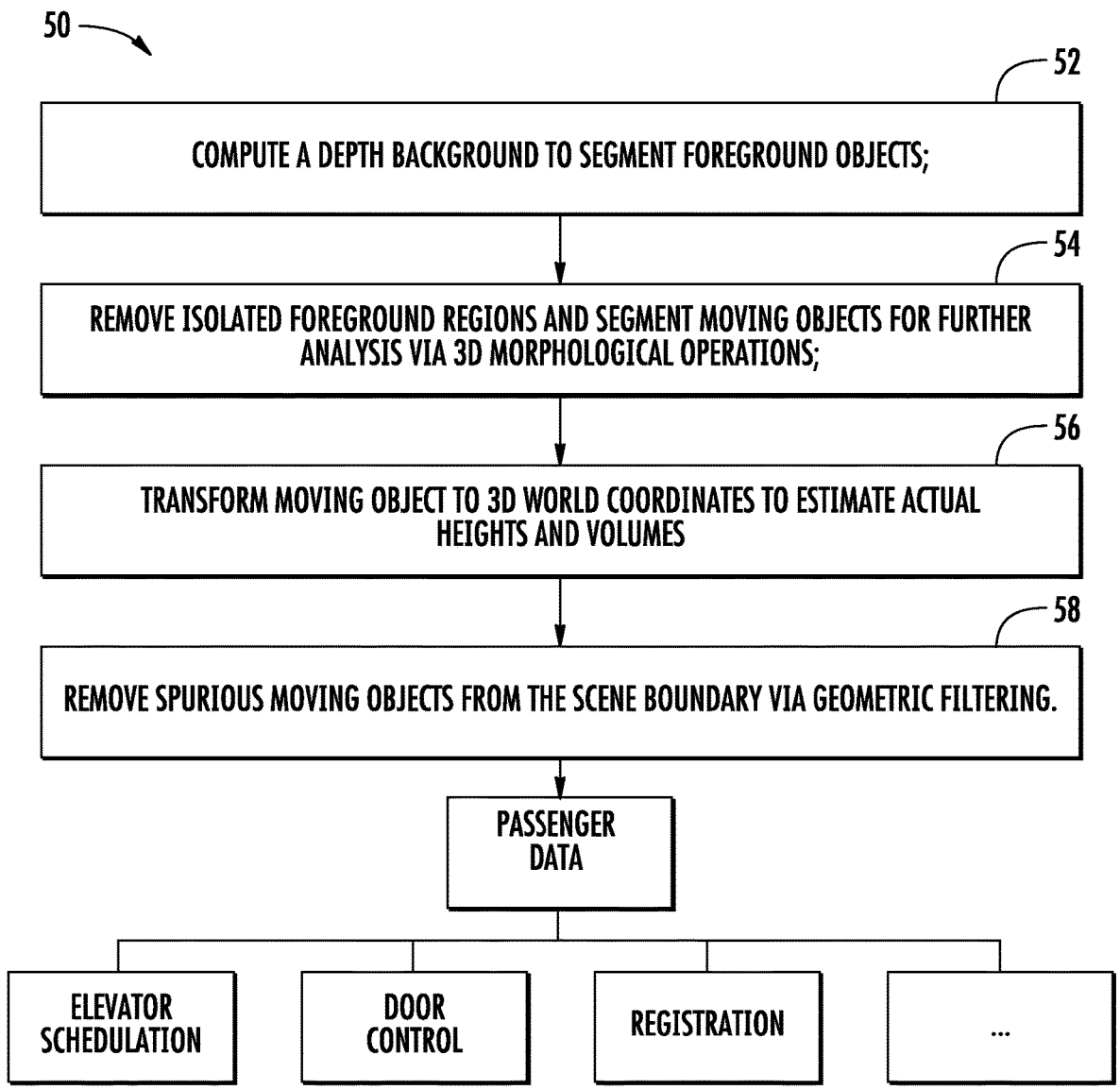
FIG. 4 is a block diagram of an algorithm for an elevator system according to another disclosed non-limiting embodiment.
Figure 5:
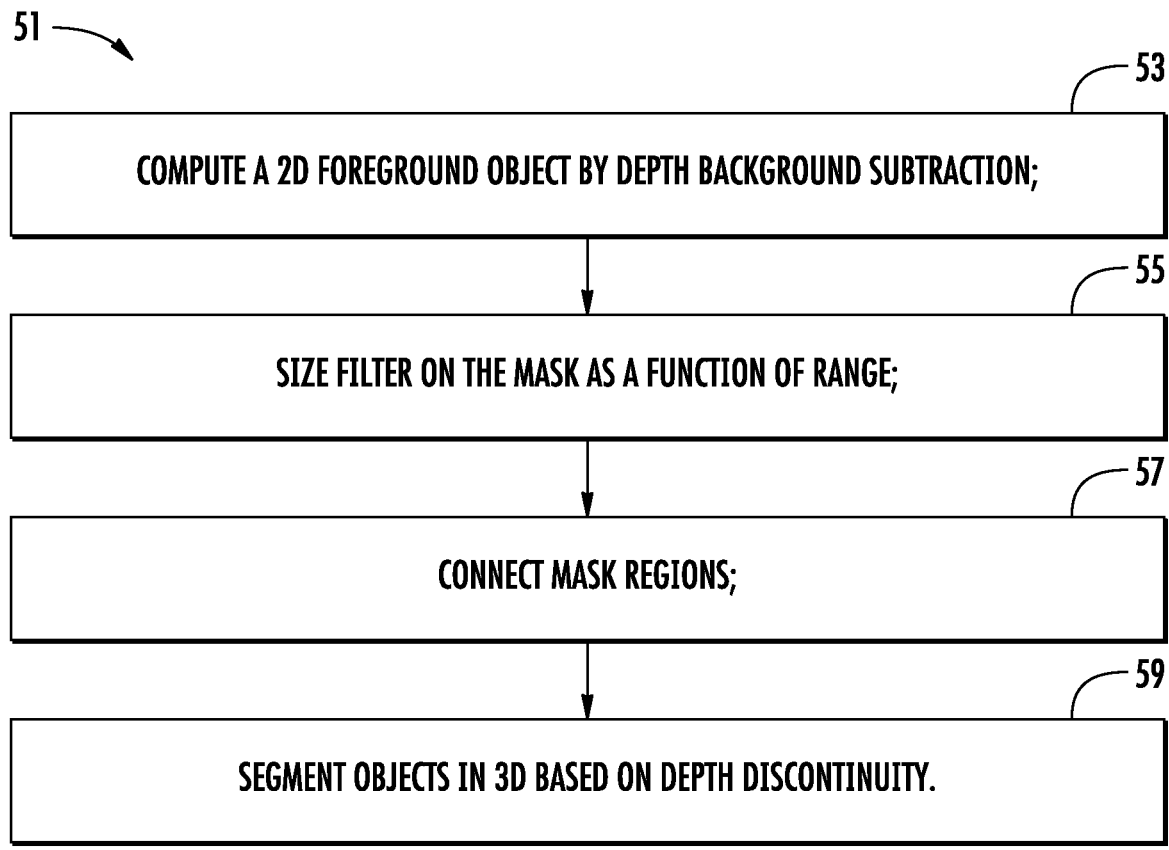
FIG. 5 is a block diagram of an algorithm for an elevator system according to another disclosed non-limiting embodiment.

With reference to FIGS. 4 and 5, in another disclosed non-limiting embodiment, processes 50, 51 for rejection of spurious data are disclosed in terms of functional block diagrams. These functions can be enacted in dedicated hardware circuitry, programmed software routines capable of execution in a microprocessor based electronic control system, or a combination including at least one of the foregoing.

Spurious data rejection process 50 can include multiple steps. First, a depth background can be computed which can be used to segment foreground objects, e.g., a passenger, luggage, etc., from the background, e.g., walls and floors (step 52). The depth data may be three-dimensional. It should be appreciated that the depth data may alternatively be referred to as a depth map, point cloud, or occupancy grid. The depth data may be relatively "noisy."

A multi-dimensional-based approach can be used to model the depth background. 2D imager background modeling approaches can be insufficient for depth background modeling. For example, the depth uncertainty can be an analytical function of range, the depth data error can be discontinuous (or not continuous), and the depth distribution can be non-Gaussian as compared to typical 2D image data (e.g., not able to be represented by a continuous probability distribution), or a combination comprising at least one of the foregoing which can render the 2D imager background modeling insufficient for depth background modeling.

Second, after background subtraction and foreground detection, morphological operations may be used to filter isolated small foreground regions (e.g., which can be "noise") and to segment moving objects, called blobs, for further analysis (step 54). This analysis can be performed in 3D. However, 3D extension of 2D connected components may be inappropriate since the 3D data still has self-occlusion, e.g., "shadows" in an occupancy grid. An approach to filtering may include a process of extending 2D connected components to include an "unknown" category in the occupancy grid for 3D morphological filtering.

The morphological filtering is further explained in reference to FIG. 5. In 3D morphological filtering 51, accounting for occlusion can be performed in multiple steps (e.g., as shown in FIG. 5 which can include four successive steps). A 2D foreground object mask can be computed by depth background subtraction (step 53). Foreground objects within the mask can be at any depth, and partially or completely occlude objects therebehind.

Size filtering can be performed on the mask as a function of range that may remove objects below a predetermined size (step 55). Any "nearby" mask regions are connected using 2D connected components that potentially merge objects with distinct depths (step 57). The objects can then be segmented in 3D based on depth discontinuity (step 59). It is possible that some objects after depth discontinuity segmentation will be relatively small, e.g., someone almost entirely occluded by another person will appear as a small blob. This approach can be used to track such small objects so they can be classified rather than filtering them out.

In reference to FIG. 4, with the sensor calibration result disclosed elsewhere herein, the foreground blobs can be transformed to 3D world coordinates, and their actual heights and volumes can be estimated (step 56). Morphological filtering can be used to remove a blob if selected characteristics, such as height, width, aspect ratio, volume, acceleration, velocity, and/or other spatiotemporal characteristics are outside a detection threshold (e.g., dynamically calculated threshold, static threshold, or the like).

Geometric filtering can be applied to further remove spurious blobs outside the scene boundary (step 58). The depth background defines a 3D scene boundary of the environment. A blob representing a real object should be within the 3D boundary. That is, if a blob's depth is larger than the depth of the corresponding location of the depth background, then the blob is outside of the 3D boundary and can be removed, e.g., a blob detected from reflective surfaces such as a mirror. Passengers or other moving objects can then be readily detected by a background subtraction technique with high robustness to illumination change, shadows, and occlusion, to thereby provide accurate passenger data. To further increase detection robustness, temporal information can alternatively or additionally be utilized, e.g., by tracking Passenger tracking may also be based on the binary foreground map and a method such as a Kalman filter to track passengers and estimate the speed and moving direction thereof. Based on detection, tracking, and counting, passenger data such as the presence of a passenger in the lobby, an estimated time of arrival (ETA), and a number of waiting passengers can be obtained. Such passenger data can then be used to, for example, improve lobby call registration and elevator dispatching.

For example, the detection, tracking, and counting, facilitated by the depth-sensing device may facilitate registering a hall call for an approaching passenger, particularly at a terminal floor; opening the car doors for an approaching passenger if a car is already at the floor; prepositioning a car based on an approaching passenger; and/or generating multiple hall calls based on the number of approaching passengers such as when multiple passenger essentially simultaneously leave a seminar.

In another disclosed non-limiting embodiment, the sensor 62 can be installed with a FOV toward the elevator doors 24 and the lobby H. Such a position facilitates continuous monitoring of the lobby H such that information may be obtained far more completely and further in advance of that which is available by a sensor in car which can sense the lobby H only when elevator doors are open. Similar processes may alternatively or additionally be employed as above, but specifically designed and trained for the 3D depth map data.

Figure 6:
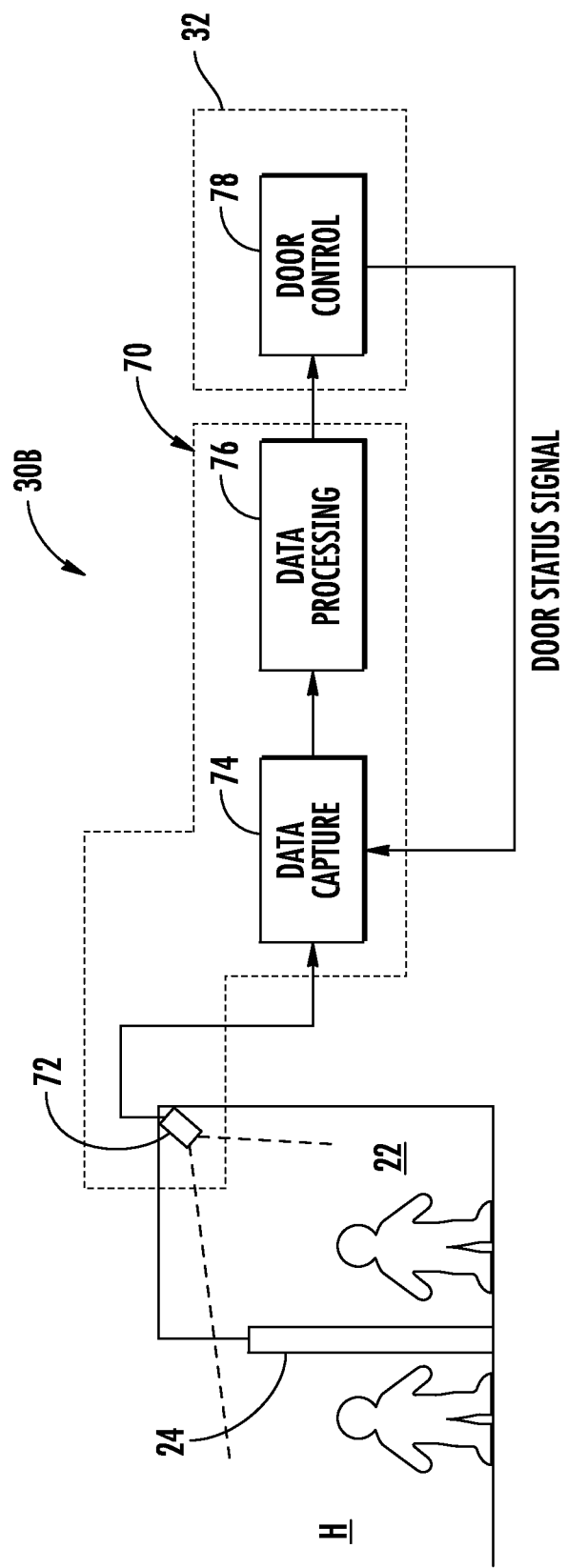
FIG. 6 is a block diagram for an elevator system according to another disclosed non-limiting embodiment.

With reference to FIG. 6, in another disclosed non-limiting embodiment, a sensor system 30B may include a passenger tracking system 70 within the elevator car 22 to facilitate operation of the elevator doors 24. The passenger tracking system 70 may include a sensor 72 that communicates with a data capture module 74, and a data processing module 76 that communicates with the data capture module 74 and a door control module 78. The passenger tracking system 70 can be a portion of the control system 32, a stand-alone unit, or other system such as a cloud-based system in communication with the control system 32.

Passenger tracking system 70 can be specially designed to utilize depth map data. Tracking may be regarded as a Bayesian Estimation problem, i.e., what is the probability of a particular system state given the prior system state, observations, and uncertainties. In such tracking, the system state may be the position of the tracked object, e.g, location and, possibly, velocity, acceleration, and other object characteristics, e.g., target features as disclosed elsewhere herein. The uncertainties are considered to be noise. Depending on what simplifying assumptions are made for mathematical tractability or efficiency, the Bayesian Estimation becomes the variants of Kalman Filtering (assumption of Gaussian additive noise) or the variants of Particle Filtering (assumption of non-Gaussian noise). In 2D and 3D object tracking, where there are many pixels/voxels on target, the system state often includes a target representation that includes discriminative information such as color descriptors (2D only), shape descriptors, surface reflectivities, etc. The possible target models are sensor and application specific.

One disclosed non-limiting embodiment of depth data tracking for passenger tracking system 70 is based on Kalman Filtering and the system state includes five (5) variables: x, y, h, vx and vy, which represent target's real world x and y position, height, and velocities in the x and y directions. The tracking process comprises two steps: prediction and update. A constant velocity model, or other types of model such as random walk or constant acceleration models, can be applied for prediction and, through the model, targets (their states) in a previous depth map can be transferred into the current depth map. A more complex model can be used if needed. In the update step, first all the targets in the current depth map are detected with an object detection process, i.e., depth based background subtraction and foreground segmentation, as disclosed elsewhere herein, then the detected targets are associated with predicted targets based on a global optimal assignment process, e.g. Munkres Assignment. The target's x, y, and h variables are used as features for the assignment. The features (x, y, and h) are effective to distinguish different targets for track association.

For the predicted target that has an associated detected target, the target system state can be updated according to the Kalman equation with the associated detected target as the observation. For a predicted target that has no associated detected target, the system state may stay the same, but the confidence of target will be reduced, e.g., for a target that is already going out of the field of view. A track will be removed if its confidence falls below a predetermined or selected value. For a detected target that has no associated predicted target, a new tracker will be initialized.

Other tracking approach like Particle Filtering may alternately or additionally applied which will be more robust in cases where a target abruptly changes its velocity. The Kalman approach, requires relatively little computational cost and may therefore be more suitable for real-time application.

In this embodiment, the sensor 72 may be installed at the top of an elevator car 22 with a FOV downward and toward the elevator doors 24. The sensor 72 can thereby be operable to perceive passengers in the car 22 and also, when the elevator doors 24 are open, may be operable to perceive passengers in the lobby H. The data capture module 74 captures data, e.g., 3D depth map data, from the sensor 72. When the door control module 78 sends a signal to open the doors 24, for example after elevator 22 stops at a floor, the door control module 78 may also trigger a signal for the data capture module 74 to capture sensor data. In one embodiment, passenger tracking may only be active when the doors 24 are open and/or may be inactive when the doors 24 are closed. In another embodiment, the data capture module 74 may continuously process data and thereby detect when the doors 24 are open, eliminating the need for this information from the door control module 78, such that the door control module 78 is free of the door position information.

Figure 7:
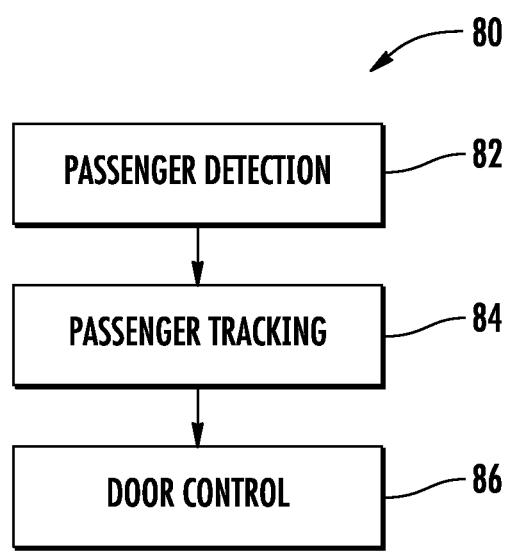
FIG. 7 is a block diagram of an algorithm for an elevator system according to another disclosed non-limiting embodiment.

With reference to FIG. 7, in another disclosed non-limiting embodiment, process 80 for detecting objects in the elevator car 22 and in the lobby H is disclosed in terms of functional block diagrams and it should be appreciated that these functions can be enacted in either dedicated hardware circuitry or programmed software routines capable of execution in a microprocessor based electronics control embodiment The data capture module 74 communicates the data to the data processing module 76 to detect objects in both in the elevator car 22 and in the lobby H (step 82). The object detection may include foreground detection, as disclosed elsewhere herein, and passenger detection using computer vision processes for depth data. Passenger detection may be achieved by human model fitting, e.g., by using a Deformable Part Model, and classification, where the detection and classification can be specially trained for the FOV and 3D depth map data.

Next, the detected objects will be tracked to obtain their moving speed and direction (step 84). The speed and direction can be in the sensor coordinate system, and/or through sensor calibration, in the world coordinate system as further disclosed elsewhere herein. If detected passengers are just standing in the elevator car 22 or the lobby H, their moving speed is 0, which indicates that these passengers are not immediately going to board or exit the elevator car 22.

For depth map based tracking, various processes can be used as disclosed elsewhere herein. Particular motion detection functions, for example, using Bayesian Estimation, determines if a passenger is just shifting position, or is intentionally moving toward the doors 24 from within the car 22. This is particularly beneficial to specifically identify if a passenger at the rear of a crowded car 22 who wishes to exit.

With the information of moving speed and direction of passengers both in the elevator car 22 and in the lobby H, the elevator doors 24 may be respectively controlled (step 86). For example, if numerous passengers are boarding or exiting, the elevator doors 24 can be controlled to remain open relatively longer than normal and then be closed promptly after all the passengers have boarded or exited. Conversely, if there are no passengers waiting to board or exit, the elevator doors 24 can be controlled to close relatively more quickly than normal to reduce passenger wait time and improve traffic efficiency.

Figure 8:
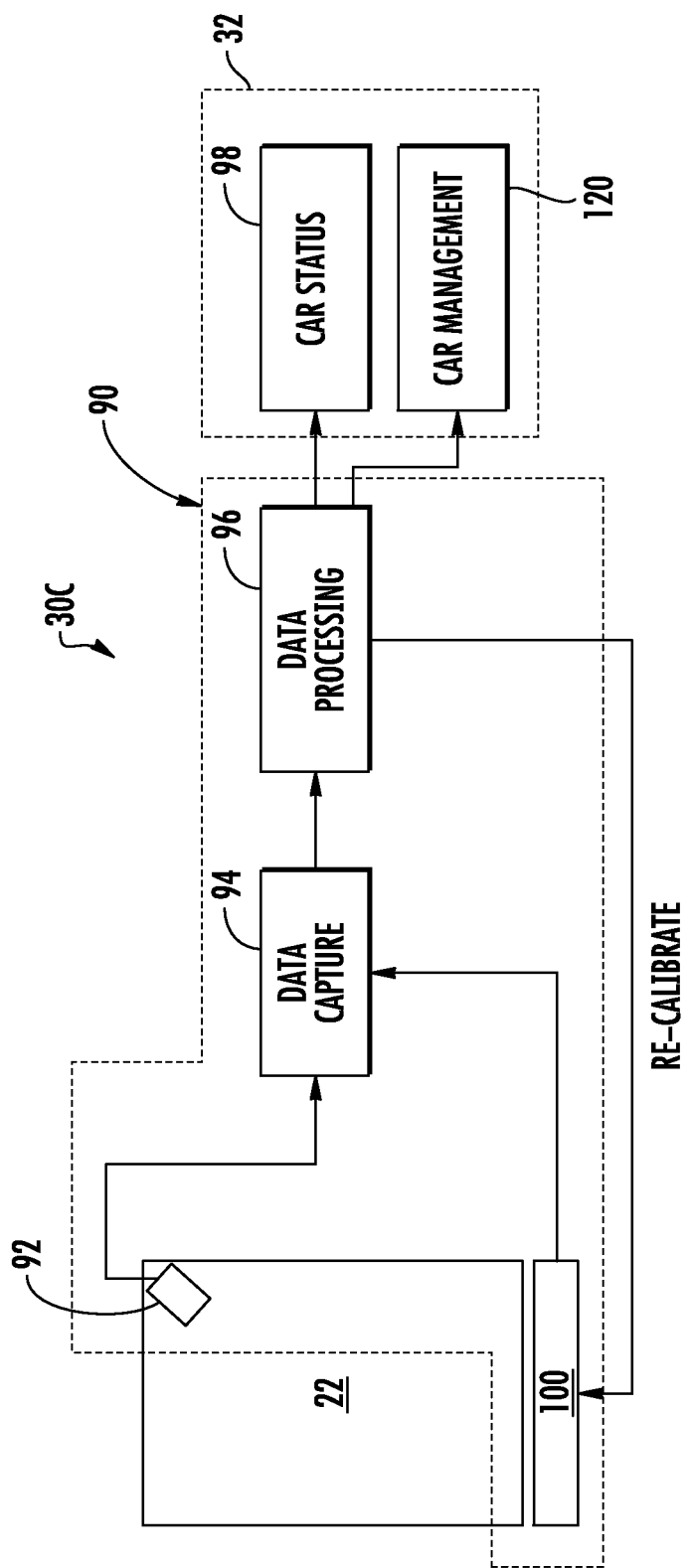
FIG. 8 is a block diagram for an elevator system according to another disclosed non-limiting embodiment.

With reference to FIG. 8, in another disclosed non-limiting embodiment, a sensor system 30C may include an unoccupied car determination system 90 to facilitate determination as to whether the elevator car 22 is unoccupied, as an unoccupied elevator car 22 may be advantageously moved from five to ten times faster than an occupied elevator car 22 or moved in other ways not comfortable to passengers and/or within code restrictions.

The unoccupied car determination system 90 may include a sensor 92 that communicates with a data capture module 94, and a data processing module 96 that communicates with the data capture module 94, and a car status module 98. The unoccupied car determination system 90 can be a portion of the control system 32, a stand-alone unit, or other system such as a cloud-based system in communication with the control system 32. The unoccupied car determination system 90 may additionally include a load sensor 100 in communication with the data capture module 94 and the data processing module 96.

Figure 9:
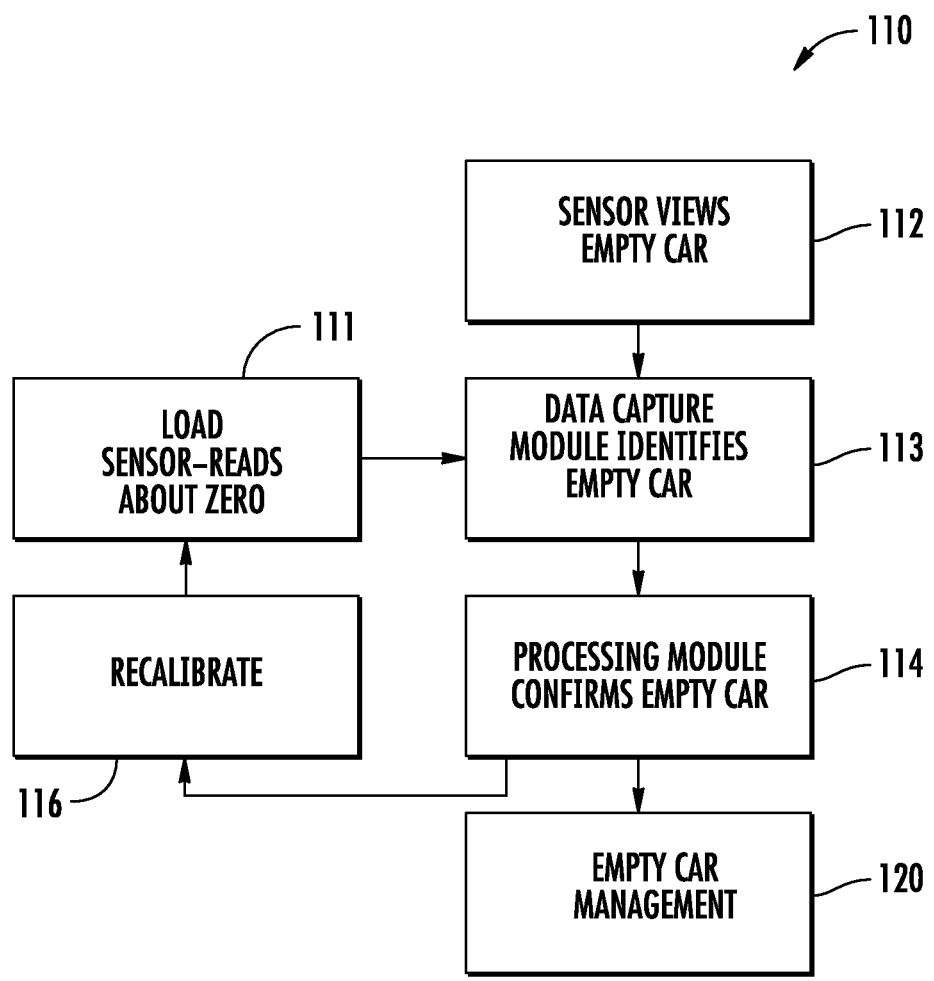
FIG. 9 is a block diagram of an algorithm for an elevator system according to another disclosed non-limiting embodiment.

With reference to FIG. 9, in another disclosed non-limiting embodiment, process 110 for determining elevator car 22 is unoccupied is disclosed in terms of functional block diagrams and it should be appreciated that these functions can be enacted in either dedicated hardware circuitry or programmed software routines capable of execution in a microprocessor based electronics control embodiment The load sensor 100 can be operable to sense a current load weight of the elevator car 22, and may further determine if the sensed load weight is less than a preset threshold. The load sensor 100 may further trigger a signal to the data capture module 94 to indicate that there is a high probability (e.g., greater than 80%, or, 90%, or 95%) that the elevator car 22 is empty (step 111). Should the data capture module 94 receive an empty signal from the load sensor 100, the data capture module 94 will pass the current depth map sensor view (step 112) to the data processing module 96 for further confirmation that the car 22 is empty via application of data capture processes (step 113). The load sensor 100, however, may be a relatively course sensor and may tend to drift in accuracy over time. If the load sensor 100 is sufficiently inaccurate, it may be desirable that data capture module 94 run continuously rather than being triggered by load sensor 100.

Utilization of a 3D depth-sensing sensor as the sensor 92 facilitates confirmation of an empty car by in-car foreground detection or passenger detection, with various analytics processes modified to operate with the depth data as disclosed elsewhere herein. The 3D depth-sensing sensor can facilitate accurate identification of passengers, heretofore undetectable objects (e.g., such as briefcases, umbrellas, luggage and the like) or a combination comprising at least one of the foregoing. Such identification can be accompanied by an audible notification, for example, "PLEASE REMEMBER YOUR BELONGINGS." It should be appreciated that other appropriate alerts may alternatively be provided.

An output of the data processing module 96 can include a signal indicating whether the car 22 is confirmed unoccupied (step 114). With this signal, elevator standby mode, unoccupied movement modes, and/or multicar functions can be accurately applied (step 120).

A signal from the data processing module 96 may additionally or alternatively be an input to the load sensor 100 for re-calibration to maintain the accuracy thereof (step 116). For example, upon confirmation of an empty car 22 via the sensor 92, the load sensor 100 can be recalibrated. In particular, if the car 22 is confirmed empty, the sensed load weight by the load sensor 100 may be set to zero, or, the difference may be used to adjust the offset in the load sensing equation.

In another disclosed non-limiting embodiment, an unoccupied car management system 120 may be utilized to facilitate operation of elevator car calls, car dispatching, and car motion, which are managed based on the determination of whether the elevator car 22 is unoccupied. More specifically, the unoccupied car management system 120 can be utilized to cancel all remaining car call(s) when the car 22 is unoccupied, balance the number of passengers between cars 22, direct passengers to specific cars 22, and/or change a motion profile to provide an enhanced passenger experience, improved dispatching, and/or increased throughput.

Figure 10:
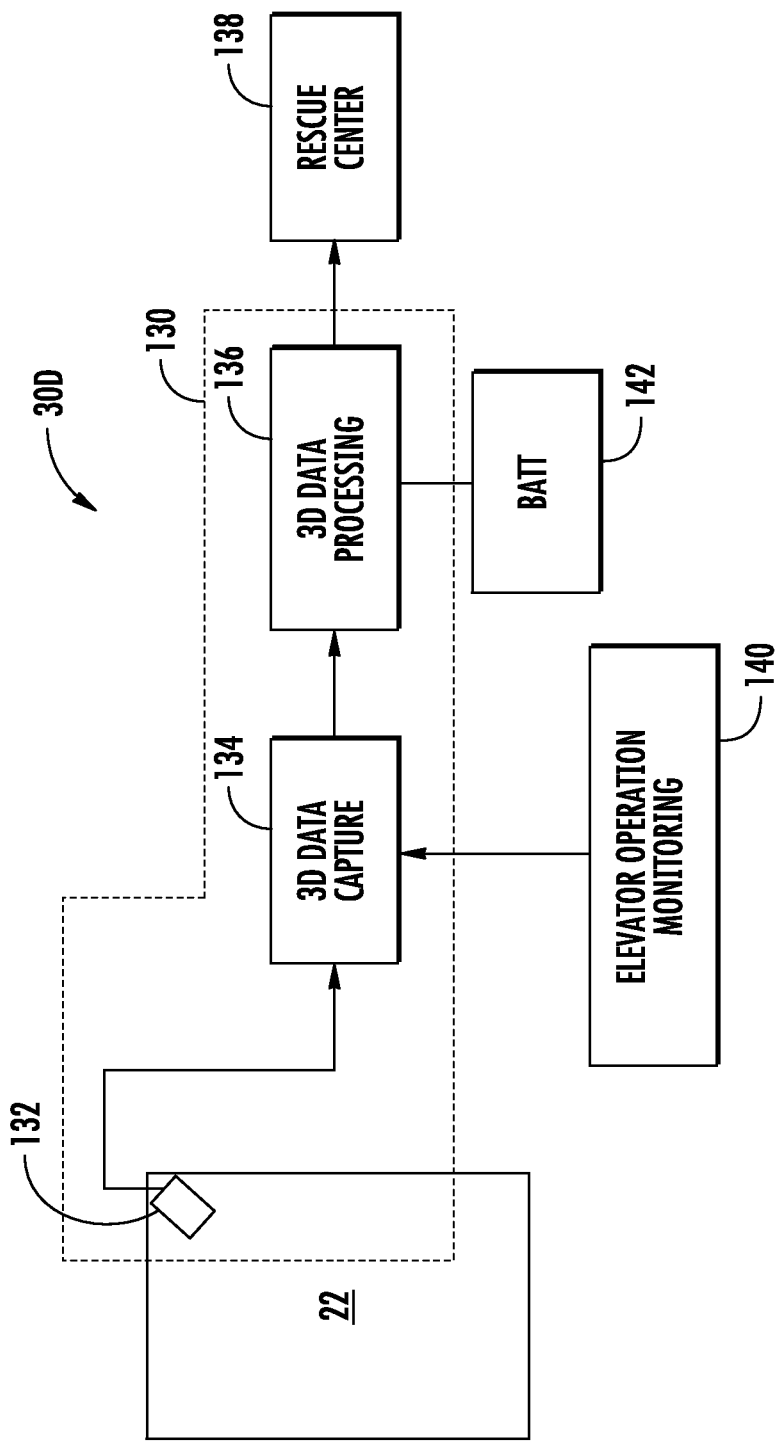
FIG. 10 is a block diagram of an algorithm for an elevator system according to another disclosed non-limiting embodiment.

With reference to FIG. 10, in another disclosed non-limiting embodiment, a sensor system 30D may include an elevator monitoring system 130 to facilitate detection of objects and/or a trapped passenger within the elevator car 22. The elevator monitoring system 130 may include a sensor 132, such as a 3D depth-sensing sensor. Utilization of the 3D depth-sensing sensor readily overcomes restrictions inherent in 2D imaging, such as illumination changes, and occlusion as disclosed elsewhere herein.

The sensor 132 communicates with a data capture module 134, and a data processing module 136 that communicate with the data capture module 132 and a rescue center module 138. The system 130 can be a portion of the control system 32, a stand-alone unit, or other system such as a cloud-based system in communication with the control system 32.

An elevator operation monitoring module 140 may also communicate with the data capture module 134. The elevator operation monitoring module 140 monitors the status of the elevator system 20 and if there is any malfunction, the elevator operation monitoring module 140 may trigger the sensor 132. The data capture module 134, when triggered, will capture one or more depth maps from the sensor 132 for communication to the data processing module 136. The data processing module 136 receives the 3D depth map data and may apply various analytics processes to determine whether there are any passengers or objects in the elevator car 22 as disclosed elsewhere herein. It is also possible for data capture module 134 to run continuously without trigger from elevator operation monitoring module 140.

In a malfunction such as a power outage, a battery backup 142 may be provided for continued 3D sensing and processing. The continued 3D sensing and processing may thus be performed in a manner to conserve battery life by judicious use under loss-of-power conditions.

Figure 11:
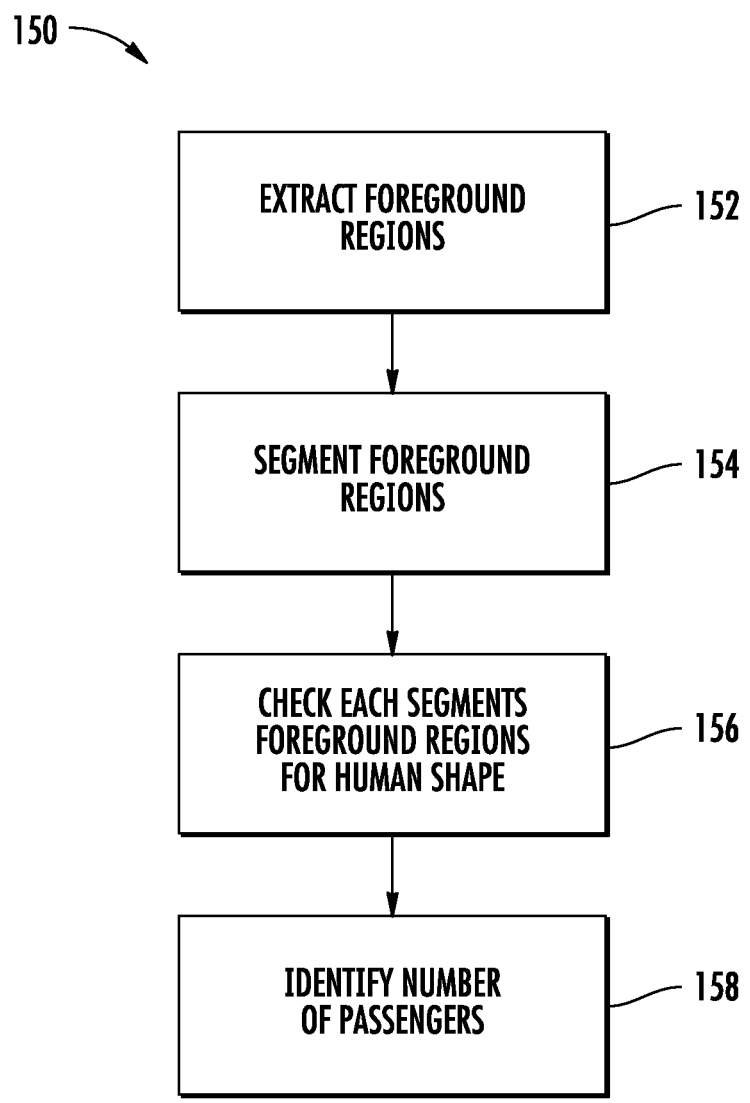
FIG. 11 is a block diagram of an algorithm for an elevator system according to another disclosed non-limiting embodiment.

With reference to FIG. 11, in another disclosed non-limiting embodiment, a process 150 for operation of the elevator monitoring system 130 is disclosed in terms of functional block diagrams and it should be appreciated that these functions can be enacted in either dedicated hardware circuitry or programmed software routines capable of execution in a microprocessor based electronics control embodiment.

The process 150 provides for initial data processing to extract a foreground region based on depth background subtraction (step 152). A depth background model may be generated a priori and updated as required. Generation of the depth background model may be based on, for example, a codebook process. The depth background subtraction with an active 3D sensor is advantageously robust to illumination changes because the transmitted signal is used to determine depth.

Next, a foreground region is segmented based on the depth map and spatial information (step 154). In this step, regions corresponding to different passengers or other objects such as luggage can be segmented from the background. Finally, each segmented region is checked with a human shape model to determine whether the depth data is of a human (step 156). In one example, the depth-based human shape model can be a Deformable Part Model to increase robustness to occlusion. The part based model may also be trained for the depth data and sensor FOV to increase accuracy. Multiple models may be created for different passenger poses, like standing, sitting, and lying down. The results are then output to indicate, for example, a number of passengers or objects (step 158). The data processing module 136 thus not only outputs information as to whether there is a trapped passenger in the elevator car 22, but also the number of passengers that are trapped for communication to the rescue center module 138 to facilitate an appropriate rescue response.

Figure 12:
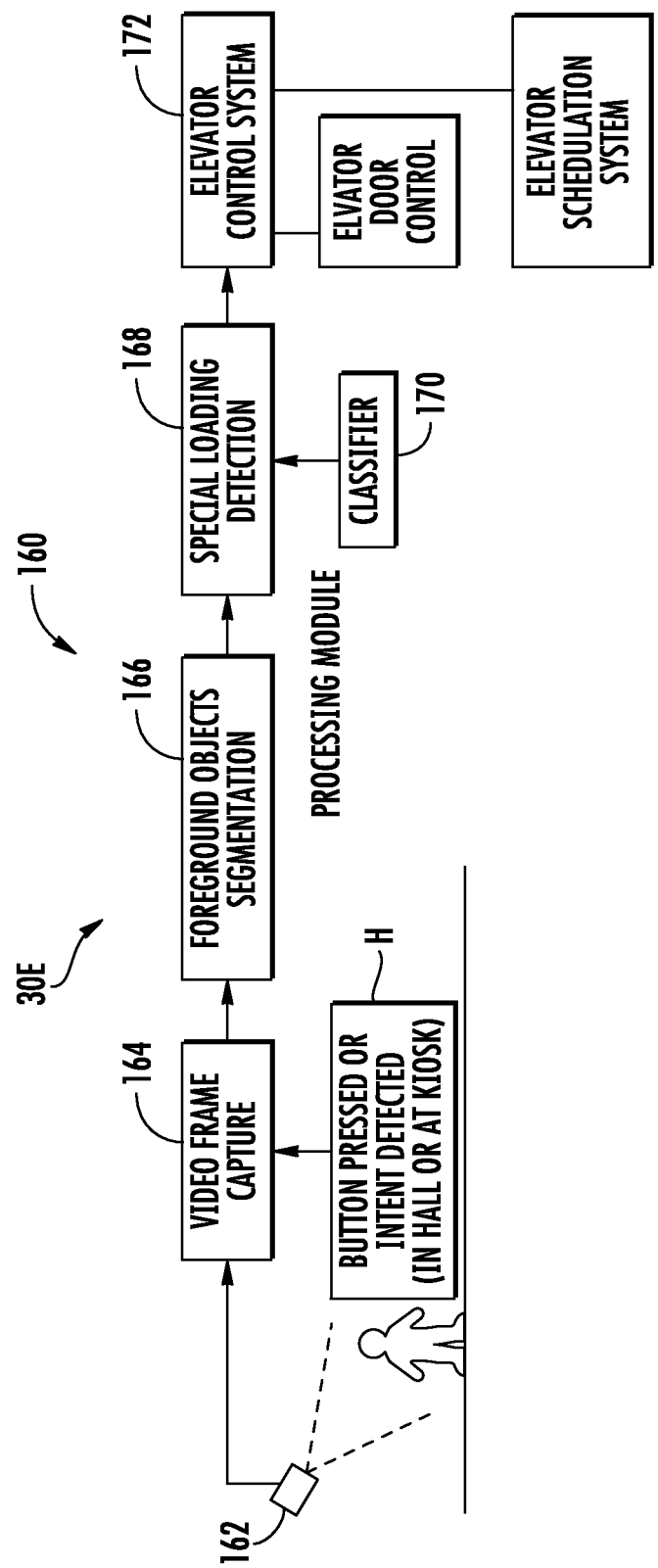
FIG. 12 is a block diagram for an elevator system according to another disclosed non-limiting embodiment.

With reference to FIG. 12, in another disclosed non-limiting embodiment, a sensor system 30E can include a special loading system 160 to facilitate the detection of special loading conditions. Special loading conditions, as defined herein, may include loading any object other than a human passenger and any loading that takes a relatively longer time than normal, e.g., for wheelchairs, the elderly, passenger with large luggage carriages, etc.

With the detection of special loading conditions, the special loading system 160 improves passenger experience and traffic performance. For example, an elevator dispatching system of the elevator control 32 can assign an elevator car 22 with sufficient free space and the elevator door control 78 (FIG. 6) can hold the elevator doors 24 open longer to accommodate slowly moving passengers or other special loading conditions such as large luggage (which might even take multiple trips in and out of the car 22 to load), service carts, or even an autonomous vehicle.

The special loading system 160 may include a sensor 162 (installed in the lobby H or at a remote kiosk) to view a passenger who desires an elevator car 22 through analytics disclosed elsewhere herein. Utilization of a 3D depth-sensing sensor as the sensor 162 overcomes the aforementioned fundamental limitations of 2D imagers.

The sensor 162 communicates with a data capture module 164, that communicates with a data processing module 166 that communicates with the data capture module 164 and a special loading detection module 168. The special loading detection module 168 may also receive information from a classifier module 170 and communicates with an elevator control system 172. The system 160 may be a portion of the control system 32, a stand-alone unit, or other system such as a cloud-based system in communication with the control system 32.

Figure 13:
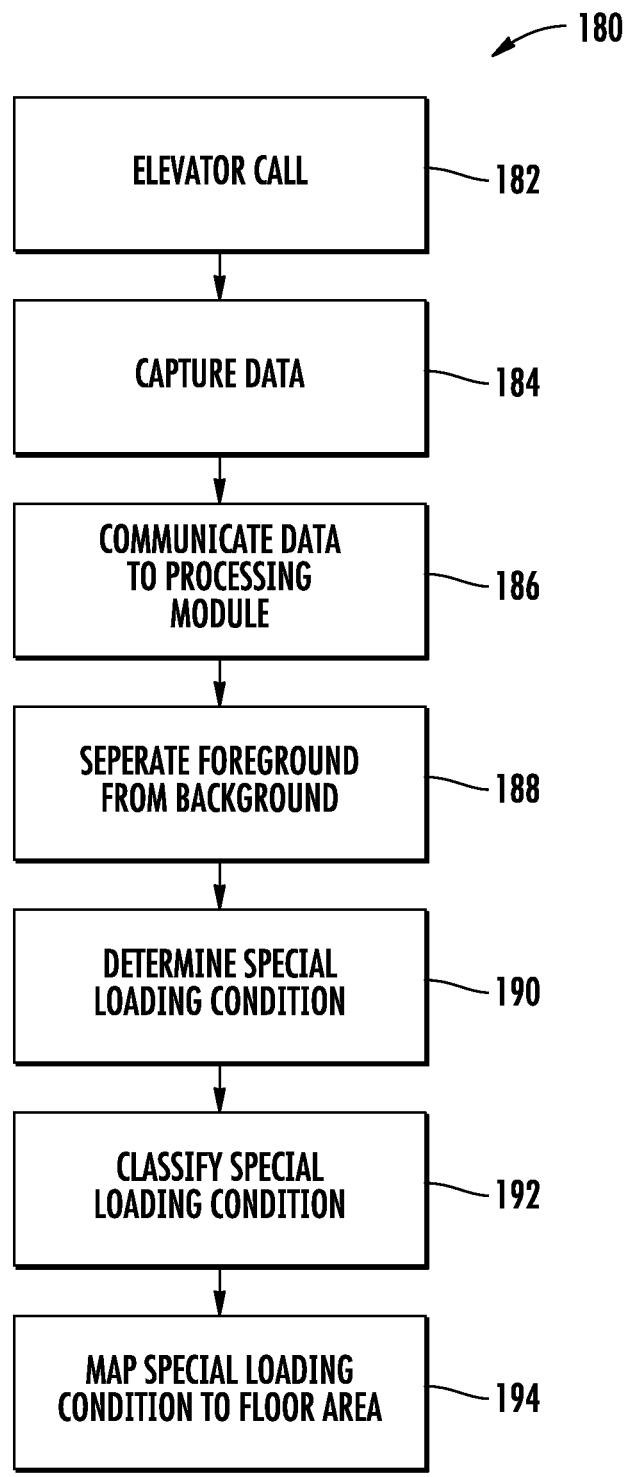
FIG. 13 is a block diagram of an algorithm for an elevator system according to another disclosed non-limiting embodiment.

With reference to FIG. 13, in another disclosed non-limiting embodiment, a process 180 for operation of the special loading system 160 is disclosed in terms of functional block diagrams and it should be appreciated that these functions may be enacted in either dedicated hardware circuitry or programmed software routines capable of execution in a microprocessor based electronics control embodiment.

Initially, in response to detection of a passengers desire to summon an elevator car as disclosed herein (step 182), the special loading process 180 will acquire depth map data from the sensor 162 (step 184) and then the depth map data is communicated to the data processing module 166 (step 186). The data processing module 166 then operates to segment foreground objects from the background as disclosed elsewhere herein (step 168). This facilitates focus on foreground objects and removes the background influence. Various background modeling and subtraction processes suitably modified and trained on depth data can be applied to segment foreground objects as disclosed elsewhere herein.

After foreground objects have been segmented, a spatial, or spatiotemporal classification approach facilitates detection of whether these foreground objects constitute a special loading condition (step 190). For the general case of a special loading condition, it may be difficult to manually define useful features for all possible special loading conditions and to encompass the large amount of possible variation in the sensor data and environment. Therefore, the special loading process 180 may be trained to learn features or feature hierarchies of special loading conditions that are different from normal loading.

With such automatically learned features, special loading detection may be effectively classified by the classifier module 170 (step 192). The classification step 190 may be, for example, feature learning and classification such as via a Deep Learning Network or Sparse Learned Dictionary. Other classifiers as known in the art may be advantageously employed. The classifier training may, for example, be performed offline for various objects, and for real-time detection, the object detection can be specifically tailored based on predetermined requirements. This permits the special loading system 160 to be more adaptable for various special loading detection needs as well as readily provide scalability.

Further, the detected special loading condition may be mapped to the floor area adjacent to the elevator. Such map mapping may include, for example, distances from a call button kiosk, and actual moving speed, so that the elevator control system 172 may be tailored for the particular dispatching decisions and motion/door control (step 194). For example, this may be performed in one step. For example, the classifier, on recognizing each special loading condition, directly outputs the learned needed floor area and actual moving speed. In an alternative embodiment, this may be performed in two steps, first the special loading condition is classified then subsequent processing of the sensor data is conditioned on the special loading condition, to compute, for example, floor area, speed, or other information.

Figure 14:
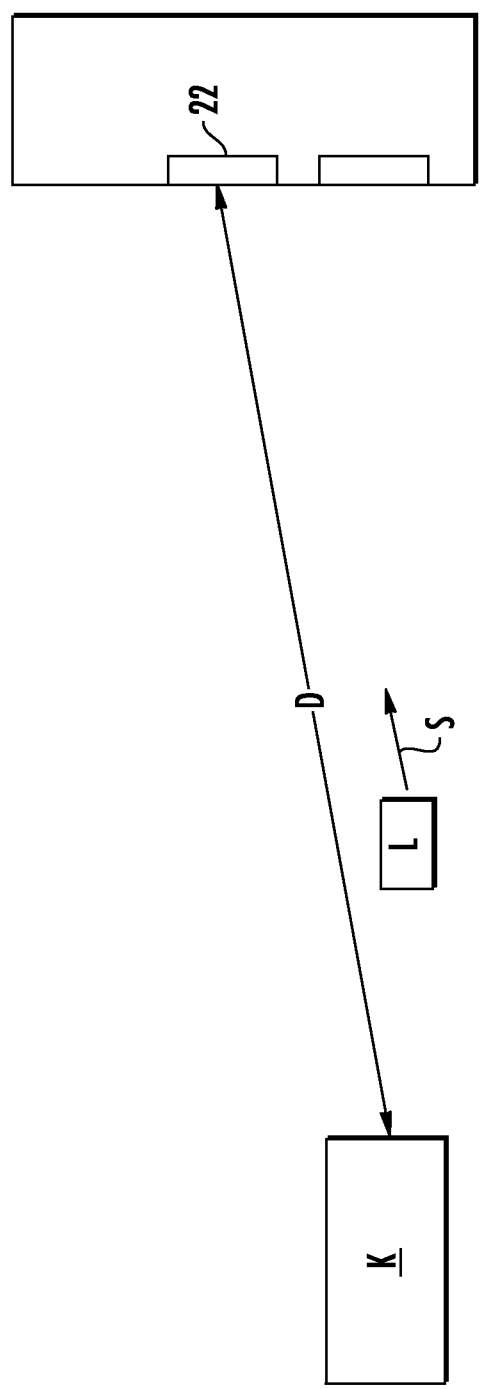
FIG. 14 is a schematic view illustrating operation of an elevator system according to another disclosed non-limiting embodiment.

In one example, and with reference to FIG. 14, a special loading condition such as a passenger with a luggage cart "L" who presses a button at a kiosk "K" may be tracked to obtain the moving speed "S," to thereby provide an ETA (estimated time of arrival) from the distance "D" to the elevator car 22. The ETA can thus be used for appropriate dispatching and door control with adequate dwell time.

Figure 15:
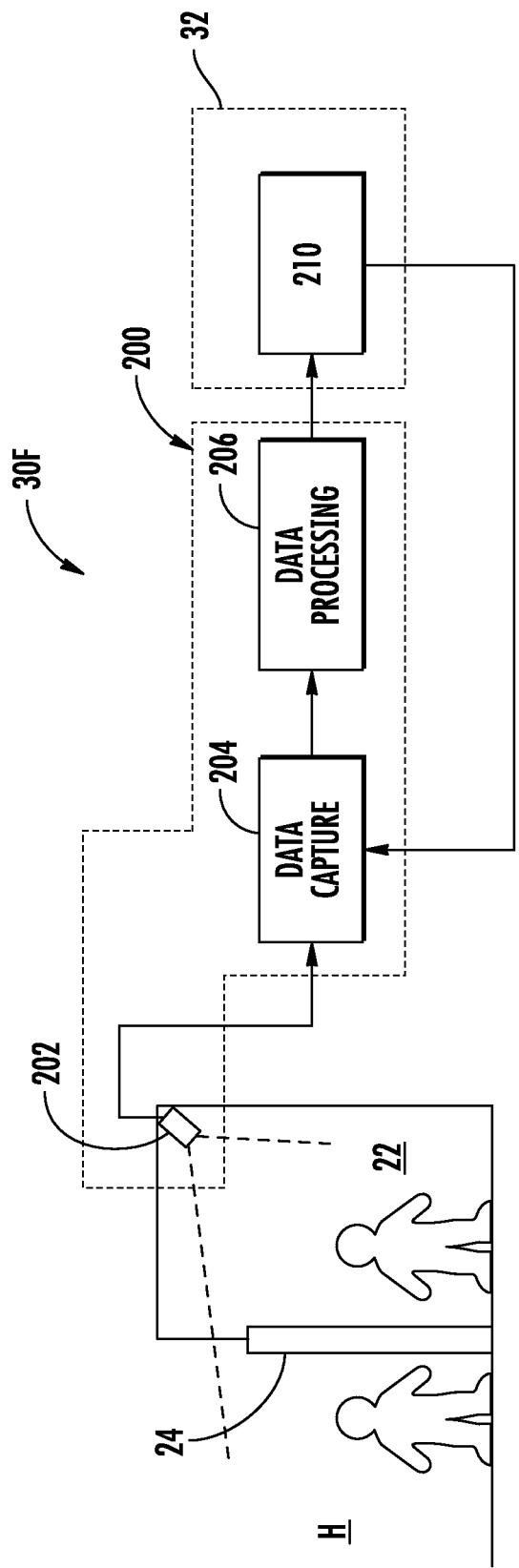
FIG. 15 is a block diagram for an elevator system according to another disclosed non-limiting embodiment.

With reference to FIG. 15, in another disclosed non-limiting embodiment, a sensor system 30F may include an auto-calibration system 200 to facilitate accurate determination of key calibration parameters rather than relying on an installer's labor, skill, and additional equipment.

The auto-calibration system 200 may include a sensor 202 such as a 3D depth-sensing sensor that can perform other functions such as those disclosed elsewhere herein. The sensor 202 may be deposed within an elevator car 22 or within an elevator lobby H. The sensor 202 communicates with a data capture module 204, and data capture module 204 communicates with a data processing module 206 and may communicate with an auto-calibration process 210. Data processing module 206 may also communicate with auto-calibration process 210. The auto-calibration system 200 can be a portion of the control system 32, a stand-alone unit, or other system such as a cloud-based system in communication with the control system 32.

Figure 16:
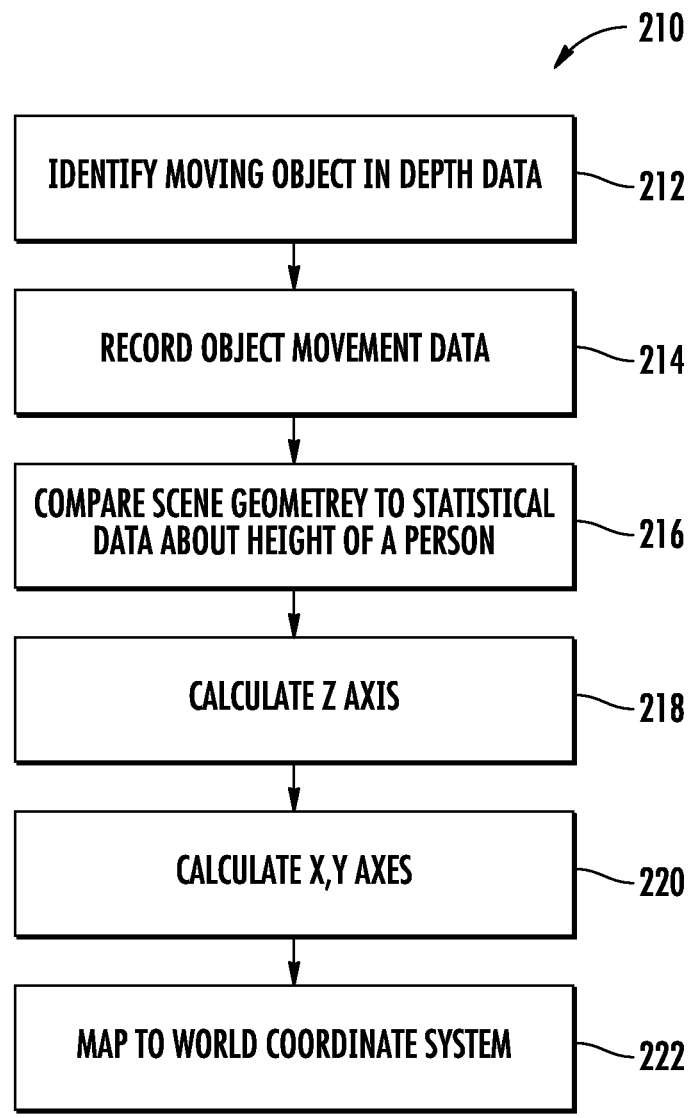
FIG. 16 is a block diagram of an algorithm for an elevator system according to another disclosed non-limiting embodiment.

The data processing module 206 may include a process 210 (FIG. 16) for operation of the auto-calibration system 200. In another disclosed non-limiting embodiment, an process 210 for auto-calibration of sensor 202 is disclosed in terms of functional block diagrams and it should be appreciated that these functions may be enacted in either dedicated hardware circuitry or programmed software routines capable of execution in a microprocessor based electronics control embodiment Initially, at least one measurement in the sensor coordinate system may be determined by the system 200 of a moving object in the field of view using background subtraction and foreground segmentation as disclosed elsewhere herein. Next, data to establish a mathematical relationship, such as a transform matrix which captures the calibration information, is recorded in the sensor coordinate system (u,v,d) pertaining to the movement of passenger through the world coordinate (x,y,z) space (step 214).

Figure 18:
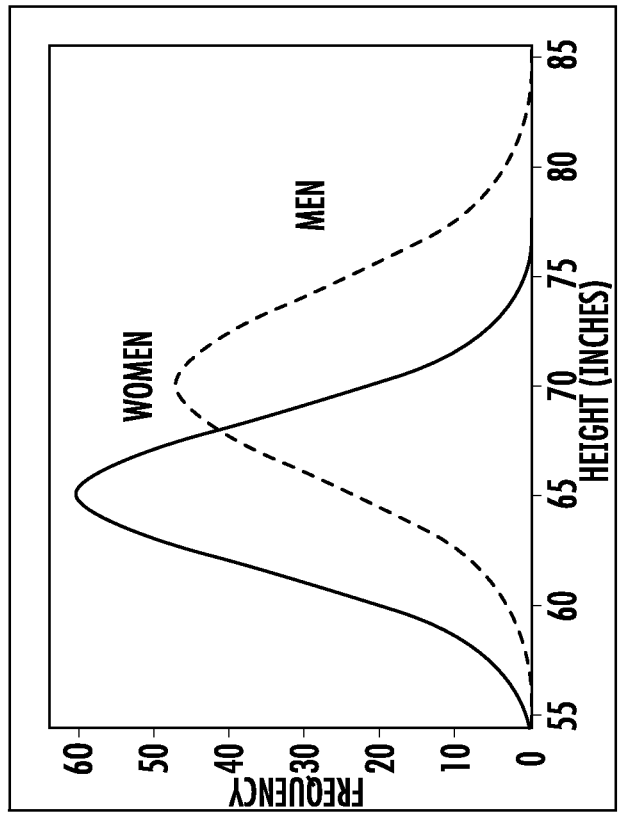
FIG. 18 is a graphical representation of statistical heights for an elevator system according to another disclosed non-limiting embodiment.
Figure 17:
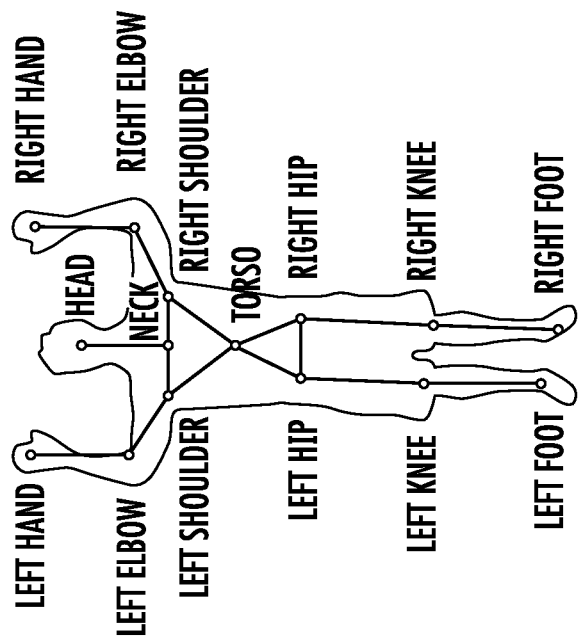
FIG. 17 is a schematic view a human tracker for an elevator system according to another disclosed non-limiting embodiment.

Next, suppositions about the scene geometry, e.g., the floor is flat, a passenger stands upright on the floor, a passenger does not change height, doors are orthogonal to floors, etc., are utilized for comparison of the recorded sensor coordinate system data with statistical data about passenger's heights (FIGS. 17 and 18; step 216). Upright passengers are detected by, e.g., connected components satisfying a simple aspect ratio threshold. Once enough upright passengers are detected, the floor plane can be determined and for each floor location the distribution of passenger's heights can be computed.

From predetermined knowledge of the distribution of passenger's heights (FIG. 18), the Z-axis can be calibrated (step 218). This Z-axis calibration from the distribution of passenger's heights can be considered a system identification problem where the requisite persistent and sufficient input is the size and motion of passenger through the field of view. The recorded height data can be collected during a setup period, maintained over a time period, and/or be subject to a forgetting factor.

From the apparent height as a function of range, or voxel aspect ratio, the (X, Y) axes can then be calibrated based on the Z-axis calibration (step 220). The sensor coordinate data may then be mapped into the world coordinate system of absolute or 'metric' units (step 222).

To further facilitate recognition of passenger's intention such as approaching, leaving, or passing by, the position of the elevator doors 24 may also be determined. The position of the elevator doors 24 may be determined based on various methods, such as detecting the location where passengers appear, disappear, depth change detection, depth of an elevator car, elevator door horizontal movement, and shape recognition. That is, the deduction of scene geometry may also be extended to locate doors, the edge of the field of view, etc. Further, any of these techniques can be combined with installer input, where convenient. The method can monitor the convergence of the matrix mathematical relationship estimation of the calibration information to determine when sufficient accuracy has been achieved.

In an alternative embodiment, the floor plane and the elevator door position can be estimated in the sensor coordinate system (u,v,d) and all tracking can be performed in this coordinate system. In this case the estimated arrival time can be learned by timing passenger's tracks, e.g., as a function of an empirical map.

In an alternative embodiment, the position of the elevator doors 24 can be established at the time of commissioning by having the installer follow a standard operating procedure whereby a calibration rig is positioned with respect to the elevator door 24. For example, the rig can be positioned flush with the center of the elevator doors 24 and oriented perpendicularly from the elevator doors 24. Additional features can be utilized to indicate each of the calibration points on the calibration rig with uniquely identifiable features, such as the use of colors, shapes or patterns such as QR codes.

In another alternative embodiment, other areas of interest besides the elevator doors 24 can be identified. For instance, the location of passenger fixtures such as the COP 28, destination entry kiosks, the location of escalator entry/exit landings, the location of turnstiles/access control devices, room entrances, doorways, etc. can be specified.

Figure 19:
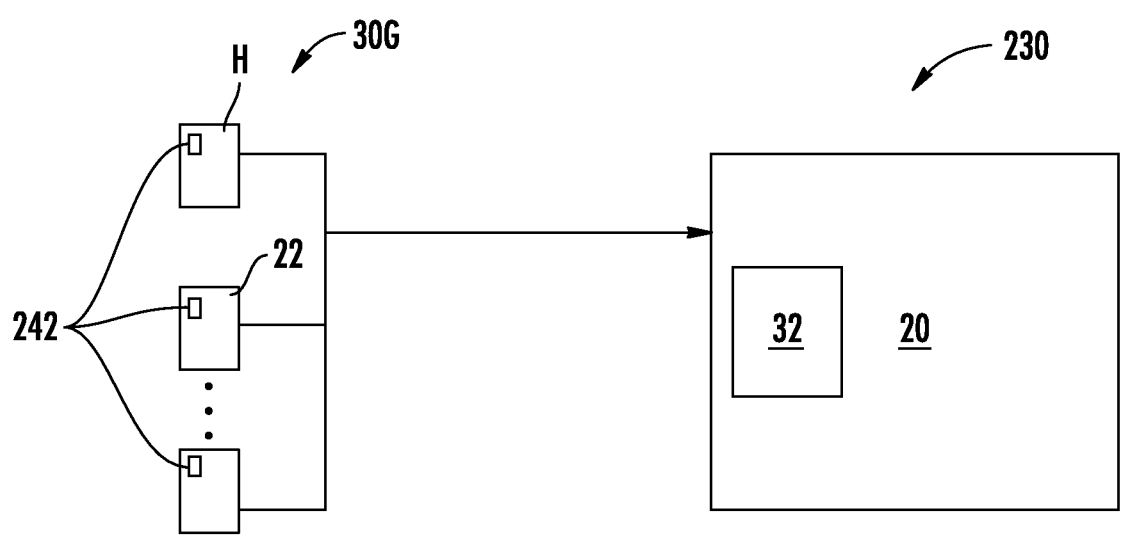
FIG. 19 is a block diagram for an elevator system according to another disclosed non-limiting embodiment.

With reference to FIG. 19, in another disclosed non-limiting embodiment, a sensor system 30G may include a passenger tracking system 230 to detect a passenger in the lobbies H and the elevator cars 22 to link all the information together to generate a traffic list (FIG. 20) for each individual in a building for various applications. For example, traffic pattern prediction based on the traffic list information can focus on the whole building level passengers' traffic information instead of single zones or multiple zones. The traffic list information provides more detailed information about passenger's behaviors in the building, and also can be used for various applications in addition to elevator control and dispatching.

The passenger tracking system 230 may include a plurality of sensors 242 that communicate with the elevator system 20 via the control system 32. In one example, a sensor 242 is located in each lobby H and each elevator car 22. Alternatively, a sensor 242 is only located in each elevator car 22. The sensors 242 can be 2D imagers, 3D depth sensing sensors, or any combination thereof.

Figure 21:
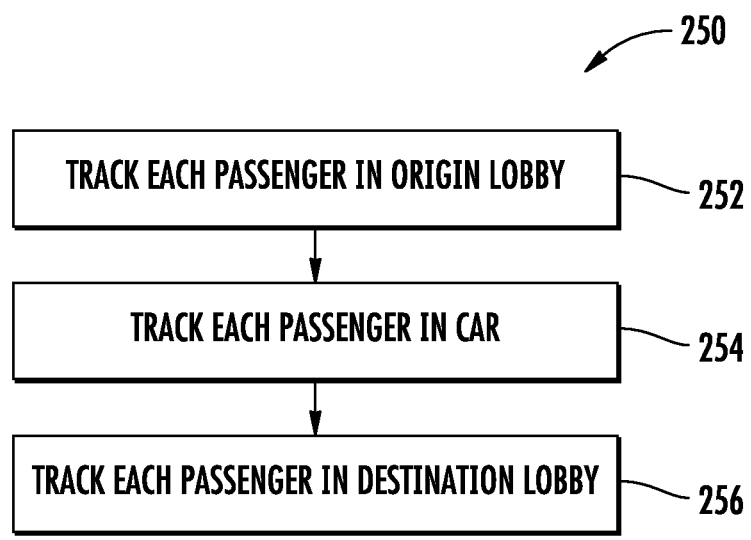
FIG. 21 is a block diagram of an algorithm for an elevator system according to another disclosed non-limiting embodiment.

With reference to FIG. 21, in this disclosed non-limiting embodiment, a process 250 for operation of the passenger tracking system 230 is disclosed in terms of functional block diagrams and it should be appreciated that these functions can be enacted in either dedicated hardware circuitry or programmed software routines capable of execution in a microprocessor based electronics control embodiment.

A traffic list (FIG. 20) contains detailed information of each individual passenger that has used an elevator, such as arrival time, origin lobby, destination lobby, etc. To generate the traffic list, each individual passenger is tracked from an initial point in a lobby, to when the passenger leaves a destination lobby, as well as through an in-car track between the origin lobby and the destination lobby.

To generate the tracking list, the sensors 242 may collect passenger information based on various passenger detection and tracking processes as disclosed elsewhere herein. Initially, each person can be detected and tracked when they appear in a lobby or upon exit from an elevator car 22 (step 252). If sensor 242 is a 3D depth sensor, the detection and tracking process disclosed elsewhere herein can be applied. If sensor 242 is a 2D imaging sensor, "integral channel features" may be computed by multiple registered sensor channels via linear and/or non-linear transformations of input images, then a passenger detection model based on the "integral channel features" can be learned by boosting, which offers a robust and fast approach for learning given a large number of candidate features, and results in fast detectors when coupled with cascade classifiers. This detection and tracking process may, for example, be based on 2D RGB video.

In one embodiment, two trackers are designed to track one target: a head-shoulder tracker via online boosting, and a body tracker based on particle filtering. A spatial constraint may also be utilized to combine the two trackers and a boosted online classifier may be maintained for occlusion and disappearance judgment.

For example, when a person enters an elevator car, in-car detection and tracking is triggered (step 254). That is, each person is tracked while within the car, and while the person is in the destination lobby (step 256). For the in-car track, the sensor is looking relatively downward, so passengers will look similar as only the head and shoulder appear in the field of view. This may complicate tracking when passengers are crowded therein. To address this complication for a 2D image sensor, each passenger's head is first detected by, for example, a circle-Hough transform, then optical flow based motion estimation is developed to filter out motionless candidates and adjust a head detection result to enclose each passenger. To further facilitate the in-car tracking, a motion-guided particle filtering approach may combine two features, e.g., an HSV color histogram and an edge orientation histogram, and may utilize an effective model updating strategy based on motion estimation.

In order to maintain the association of a person tracked in one sensor's FOV with the same person tracked in another sensor's FOV, lobby/hallway tracking and in-car tracking are associated as a passenger moves from a lobby/hallway into a car and vice versa. The 2D image sensor hand off association problem may utilize visual surveillance and techniques for both overlapping and non-overlapping fields of view and for both calibrated and non-calibrated fields of view. In one example, a descriptor, e.g. a feature vector, may be computed using color or shape and then this descriptor is used to compute the correct association across the different fields of view.

In 3D tracking, the common 2D descriptors such as color and 2D projected shape (e.g., 2D gradients) are not available. As such, a 3D descriptor, i.e., a surface reflectivity histogram, a Histogram of Spatial Oriented 3D Gradients (HoSG3D), etc. may be used. The HoSG3D is different than the 2D HoG3D descriptor because the 3rd dimension is spatial, while in HoG3D, the 3rd dimension is time. However, passenger shape passenger may be sufficiently similar that using only HoSG3D may not be sufficiently discriminative to unambiguously hand a track from one sensor to another.

In another embodiment, the natural serialization of passengers entering an elevator car may be used to associate tracks, e.g., the first lost track in one sensed volume is associated with the first newly acquired track in the other sensed volume, etc. This, too, may not be sufficiently accurate since passengers might exchange order while out of both sensed volumes, and the strict serialization of car entry may not occur. To ensure accuracy, overlapping, calibrated sensed volumes provide better performance since the position of an object in the overlapping sensed volumes can be known to be at the same spatial position.

In another embodiment, a combination of the above techniques, or can be used. When the multiple techniques provide conflicting information on the correct track association, the ambiguity may be resolved by solving a Bayesian Estimation problem to maximize the probability of correct association given the observations and uncertainties. It will be recognized that other mathematical formulations of the association problem are possible. For tracking hand over between a sensor 242A located in a lobby and a sensor 242B located in an elevator car 22, a graph based optimization approach may be utilized (FIG. 22). The graph based optimization approach, in one example, includes three layers of nodes, representative of tracking in the origin lobby, tracking in-car, and tracking in a destination lobby.

The tracking hand over is then solved by a graph-based optimization 260 to find overall best paths. The example graph-based optimization 260 may be weighted by order and time difference. That is, as passengers typically enter and leave the car in a sequential manner, filtering thereof is readily achieved to provide best paths by weights and similarity of nodes.

Figure 23:
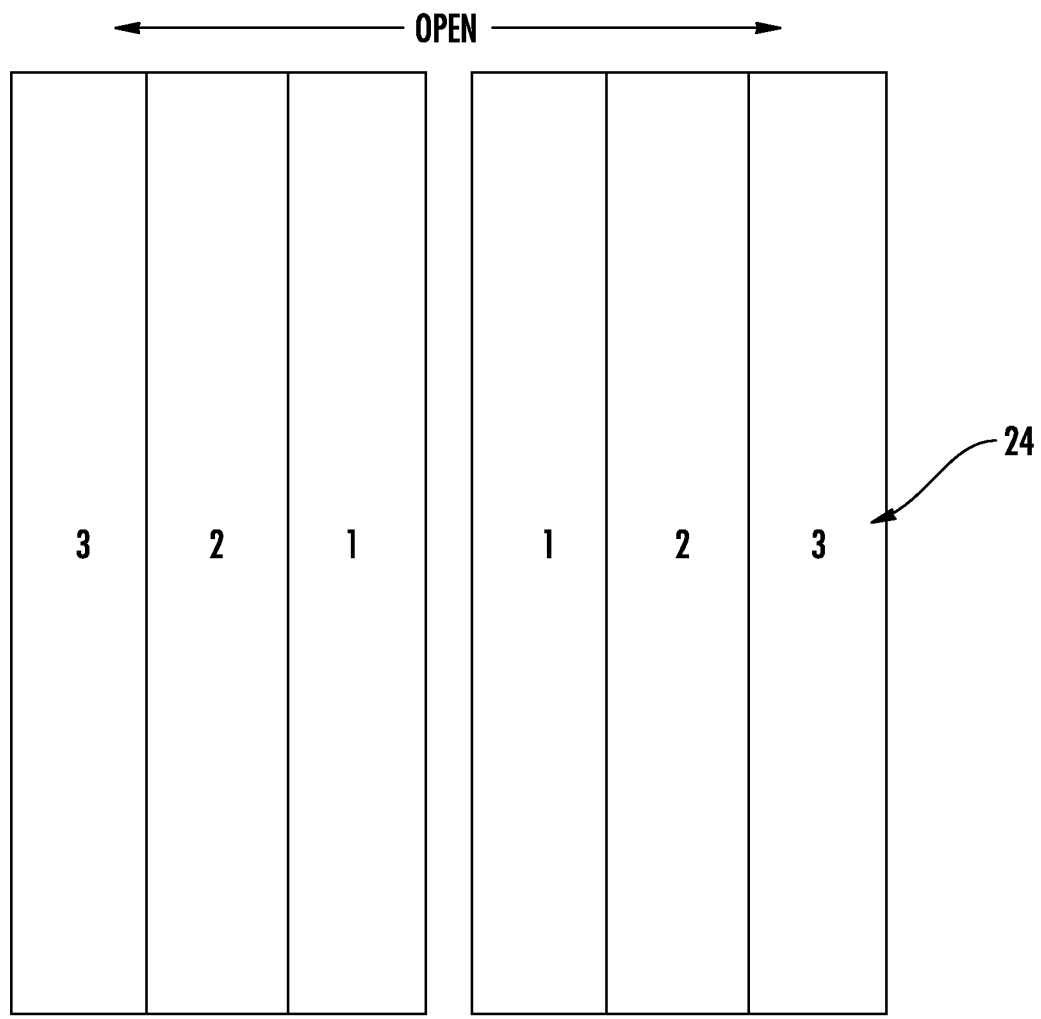
FIG. 23 is a schematic view of a door arrangement for an elevator system according to another disclosed non-limiting embodiment.

With reference to FIG. 23, if the elevator doors 24 are opening, then the vertical edges of door 24, e.g., as detected by a line-based Hough Transform, will traverse regions 1, 2 and 3 in order, and if the door is closing, the door edges will traverse regions 3, 2, 1 in order. The position of the elevator doors 24 may also be confirmed via a sensor 242B located in elevator car 22 or a sensor 242A located in lobby H with a view of elevator doors 24 to confirm the doors are opening, opened, closing, closed. That is, the elevator door status may be input from elevator controller 32 or may be detected by sensor 242A/242B to improve the performance and efficiency of a tracking hand over solution. For example, the tracking hand over need only be performed when the elevator door is open. It should be appreciated that other conveyances will also benefit herefrom.

Figure 24:
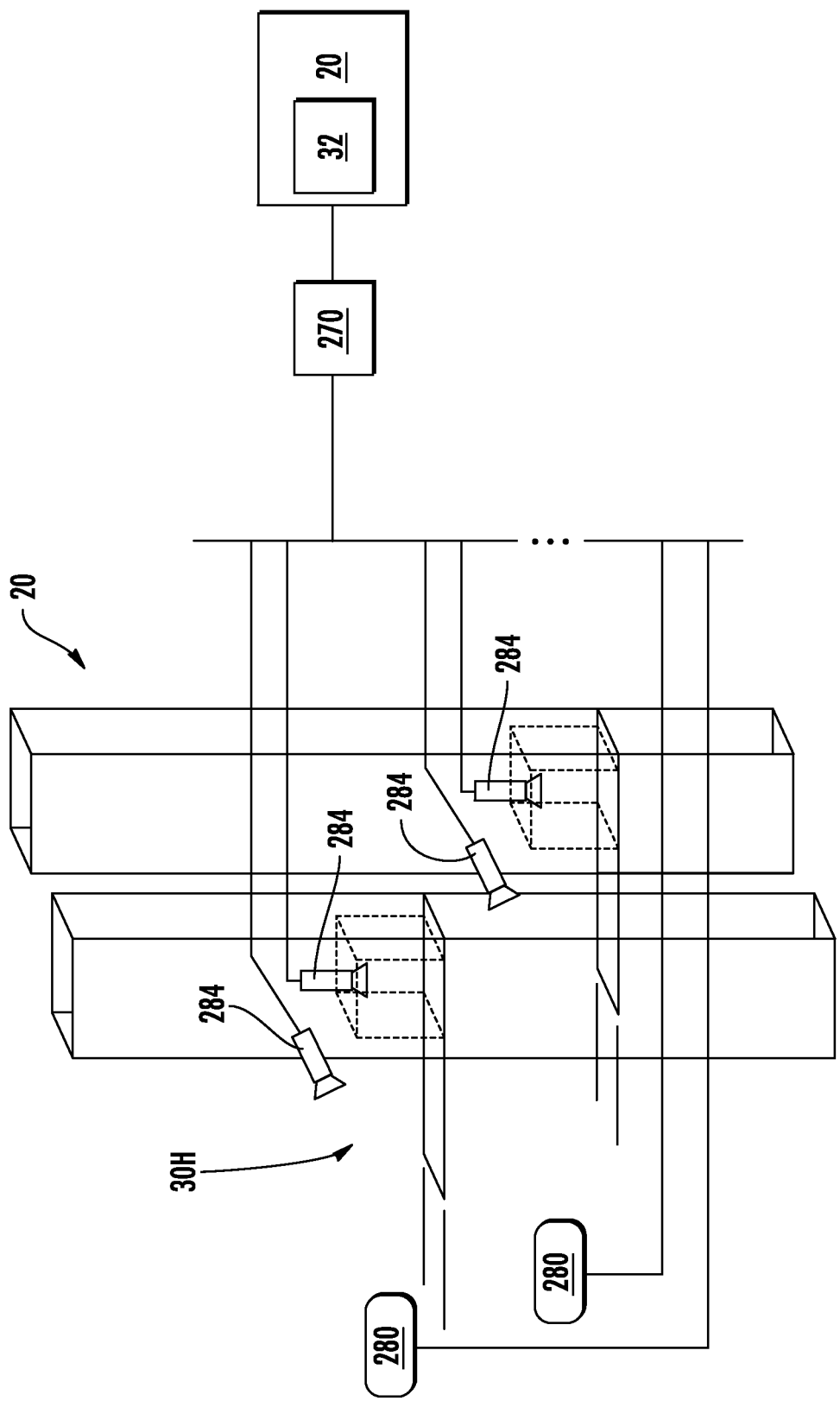
FIG. 24 is a block diagram of an elevator system according to another disclosed non-limiting embodiment.

With reference to FIG. 24, in another disclosed non-limiting embodiment, a sensor system 30H may include a fusion based passenger tracking system 270 to predict the potential movement of a passenger, then adaptively assign elevator cars based on instantaneous needs so as to bring more efficiency and convenience to elevator passengers in the building. An elevator system with a complete, accurate traffic list (FIG. 20) can predict the potential movement of passengers on, for example, an hourly, daily, weekly, etc. basis and use the elevators based on the anticipated traffic to increase efficiency and convenience to elevators passengers. In order to achieve the robust traffic list generation, a fusion based traffic list generation method is provided.

Figure 25:
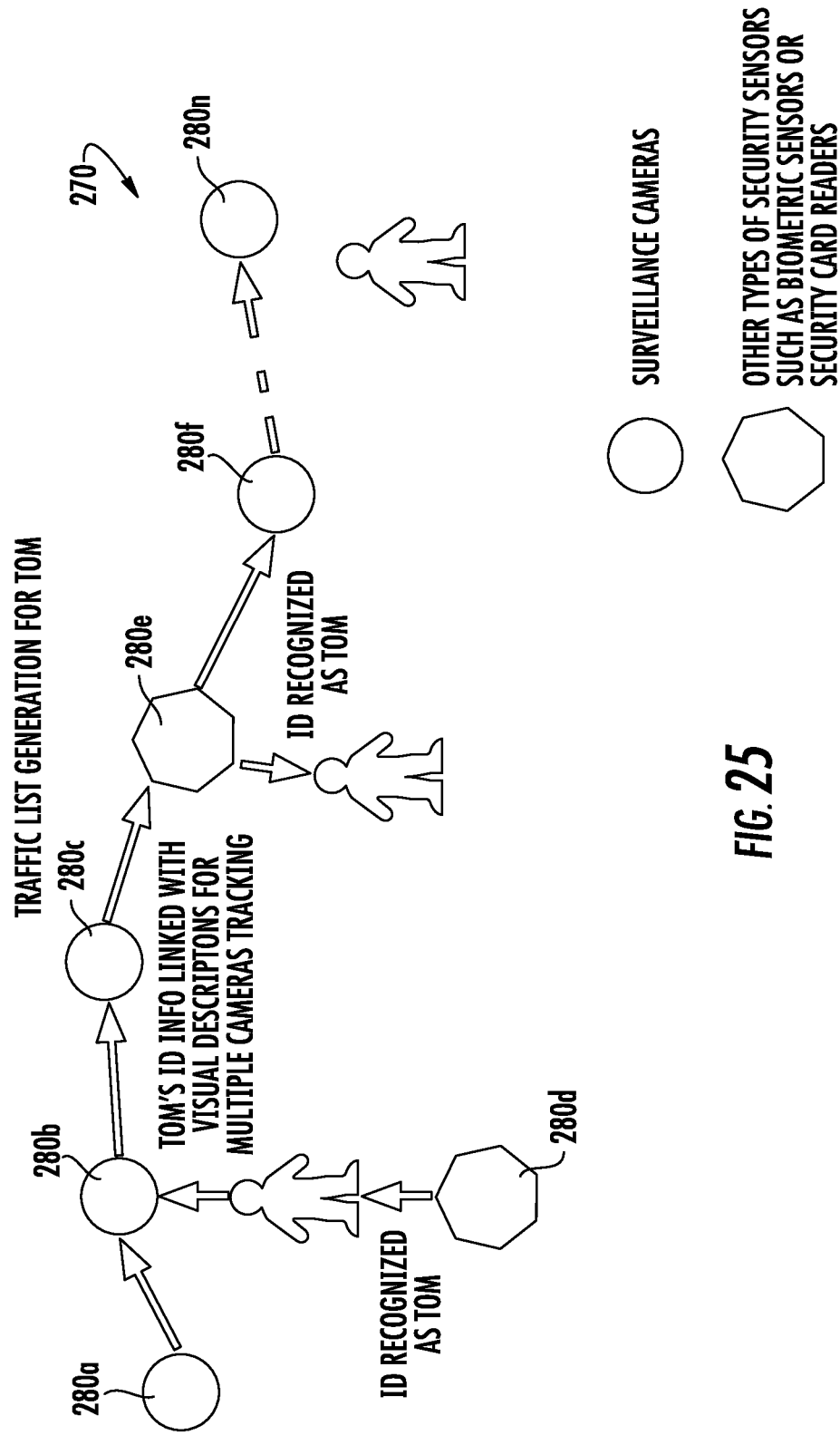
FIG. 25 is a schematic view of traffic list generation for a single user.

Referring now to FIG. 25, the fusion based passenger tracking system 270 may include a plurality of security sensors 280a-280n that communicate with the elevator system 20 via the control system 32. That is, the sensor data from the security sensors 280 essentially provides data to the control system 32 to include, but not be limited to, facial recognition, badge identification, fingerprints iris data, security card information, etc. In areas without surveillance coverage or where the analytics processes may not perform well, the additional security sensors can recognize the person and then, using sensor fusion, close the gaps in the traffic list to make the whole process more robust. In any instance where identity is associated with a passenger, the identity and associated passenger tracking data is maintained in a way that preserves privacy by using encryption, authentication, and other security measures.

The sensor fusion may be performed by Bayesian Inference, but in alternative embodiments may be performed by any well-known technique. With the security information and traffic history data, the patterns for a person moving in the building may be determined to understand normal behavior as well as improve elevator service. In this disclosed non-limiting embodiment, the traffic list contains detailed information of passengers using the elevator sensors 284, as well as security data from various security sensors 280. The data from various sensors are fused and communicated to the elevator system 20 via the control system 32. The identification information is linked with this person's visual description features, so the whole traffic list under different imager's or sensor's views will have the ID information. That is, the passenger traffic list is based on coordinating ("hand-over") between lobby and car tracking results. The fused data may then be used to facilitate elevator dispatching.

Hand-over rules may be pre-defined, such as a first-in and first-out rule. For a first-in and first-out rule, when the lobby sensor and the car sensor operate simultaneously for target tracking in the same region, and one passenger is moving from the lobby to board the car, then this out-of-lobby-into-car information may be used to link the tracker from the lobby to the tracker in the car. When the passenger leaves the car and goes to the lobby, a similar rule (out-of-car-into-lobby) may be applied to link the tracker in the car with the tracker in the lobby.

In one example, security sensors recognize a particular passenger and his security data is shared with all the other sensors to link the tracking results with that passenger's ID. Second, in some areas, where the security sensors are not installed, the security credential information may be utilized to continue tracking that passenger's presence in the building and in this way continue the traffic list generation for that passenger. Additional information derived from one imager's or sensor's view may also be shared with other imager(s) or sensor(s) to further improve track association across non-overlapping views.

The traffic lists for a single passenger may be combined over time, with time as a parameter, using Bayesian Inference for a probabilistic prediction of the passenger's intended destination. Such a system could learn that passenger A always goes to Floor N early in the morning, typically to Floor C (the cafeteria) at noon, and always goes to the Parking Garage in the late afternoon.

Further, the traffic lists for multiple passengers can be combined over time, with time as a parameter, again using Bayesian Inference. Such a system facilitates statistical distribution determination of elevator usage for the entire building during a typical day as well as weekend days, holidays, etc. This information could be used to pre-assign cars to runs (even purposefully skipping floors), for efficient parking, dispatching cars, etc.

Given the information of the traffic lists, the elevator optimization is achieved by techniques for real-time solution of an optimization problem. The traffic lists information can also be utilized for other elevator related applications such as elevator daily load estimation to provide one accurate energy report for future energy saving, elevator system diagnostics based on abnormal traffic list information, modernization value propositions, and so on.

Figure 26:
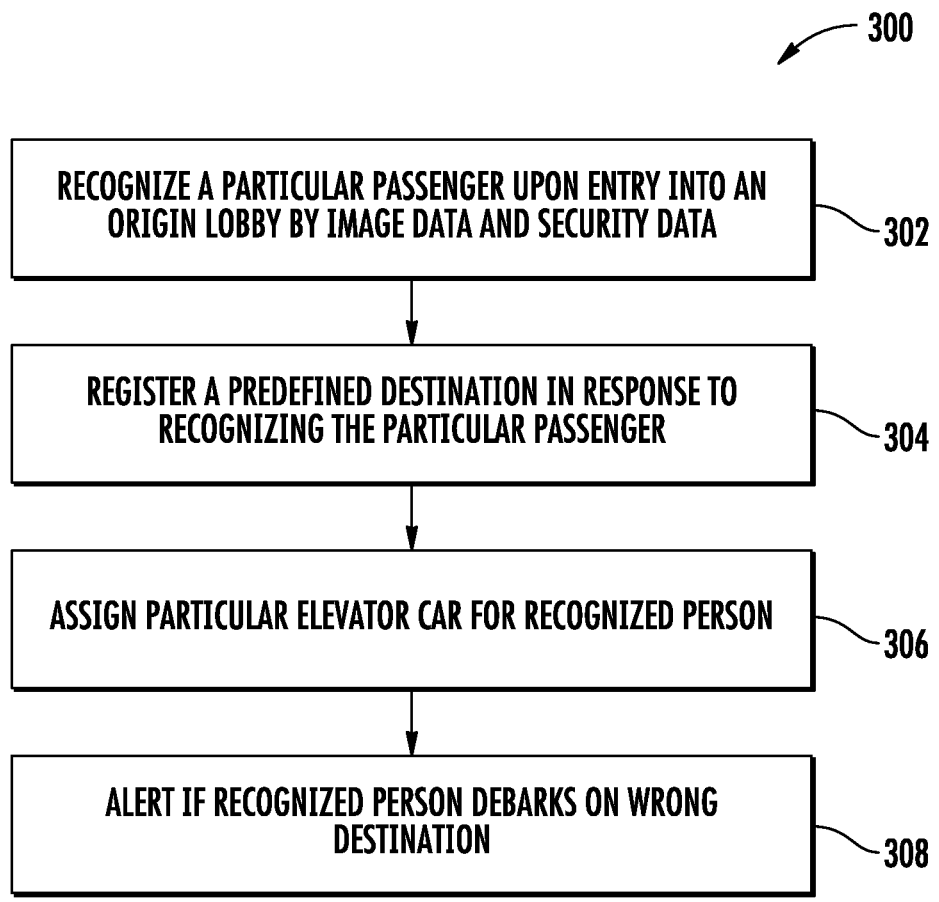
FIG. 26 is a block diagram of an algorithm for an elevator system.

With reference to FIG. 26, in another disclosed non-limiting embodiment, a process 300 may further utilize the elevator sensors 284, as well as the security data from the various security sensors 280 to recognize a particular passenger for passenger convenience, to optimize elevator operations, improve operations and/or for various security purposes. The process 300 permits multiple passengers to be simultaneously allowed in the car without confusion of destinations.

Initially, a passenger may be recognized in an origin lobby such as while approaching an elevator (step 302). The elevator sensors 284 can be simultaneously operable, disparate-view, multi-sensor recognition, particularly combining 2D imagers; and 1D, 2D, or 3D depth sensors as well as alternative or combinations thereof, i.e., 2D/3D. Again, the data from various imagers and depth sensors are fused and communicated to the elevator system 20 via the control system 32. The passenger may be recognized by, for example, something they know, e.g., a password, something they have, e.g., a token or ID card, and/or by something they are, e.g., a unique biometric. In one biometric example, face recognition is both relatively inexpensive and well developed.

Next, a call for a predefined destination floor is registered based on the recognized person (step 304). The determination of the desired floor can be prerecorded by the person or can be automatically learned by traffic analytics such as via a traffic list. Even with recognition and tracking capabilities, a pattern for the particular individual may not be automatically discernable without statistical analysis capable of ignoring outliers, i.e., due to occasional non-typical elevator usage. In one embodiment, Robust Principle Components Analysis (RPCA) for this outlier-ignoring learning is utilized. In another embodiment Bayesian Inference can be utilized.

Next, a particular elevator car is assigned for the person, and the person is directed to the appropriate car (step 306). Various assignments can be based on particular identification, common usage, etc. such that a particular passenger is always directed to the closest car, fastest car to his or her destination, etc.

The assigned car can be further provisioned with an alert if the person boards the wrong car or is heading towards the wrong car. The alert can be based upon tracking the passenger into the car, however, the alert need not be a request to exit as such a request may result in a negative customer experience. The alert, in one example, can be used to deregister the passenger in the previous car and register the intended destination floor in the new car 22. The elevator dispatching can then be re-optimized in real-time, including redirecting the passenger through sky lobbies, to provide a desired throughput and customer experience.

Next, the passenger may be tracked from the lobby, into the car, during transit, then through the destination lobby as discussed above. In some instances, while the passenger is tracked within the car, selection of a different destination can be identified. For example, while tracking the passenger to correspond with the destination, analytics that the person has pushed a button to change destination, and temporally correlated information from the car controller as to which button was pressed can be used to identify the change in destination. Once the change in destination is identified, throughput optimization can be performed thereby.

The process 300 may also alert a passenger if, for example, the passenger mistakenly exits at a destination different than that registered for that particular passenger (step 308). In one embodiment, it can be desirable to alert the passenger before the passenger actually mistakenly exits. The process 300 may thereby infer the intent or initial movement of the passenger toward the doors via track analysis, e.g., movement towards the front of the car. The customer alert may be by audible voice signal. Alternatively, for security purposes, the alert may silently notify security personnel or systems and track the passenger.

The elements disclosed and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

It should be appreciated that relative positional terms such as "forward," "aft," "upper," "lower," "above," "below," "bottom", "top", and the like are with reference to the normal operational attitude and should not be considered otherwise limiting.

It should be appreciated that like reference numerals identify corresponding or similar elements throughout the several drawings. It should also be appreciated that although a particular component arrangement is disclosed in the illustrated embodiment, other arrangements will benefit herefrom.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

Although particular step sequences are shown, disclosed, and claimed, it should be appreciated that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically disclosed. For that reason the appended claims should be studied to determine true scope and content.

What is claimed is:

1. A method of generating a traffic list comprising:
   detecting a passenger entering an elevator from a first lobby using 3D sensor data from one or more sensors positioned within the elevator;
   receiving time data to establish a timestamp associated with the arrival of the passenger;
   receiving floor position data associated with the floor position of the first lobby at a time proximate to when the passenger is detected entering the elevator;
   tracking the passenger movement while within the elevator using 3D depth sensor data from the one or more sensors in the elevator from when the passenger is detected entering the elevator from a first lobby to when the passenger is detected exiting the elevator at a second lobby;
   detecting the passenger exiting an elevator to a second lobby using 3D sensor data from one or more sensors positioned within the elevator;
   receiving floor position data associated with the floor position of the second lobby at a time proximate to when the passenger is detected exiting the elevator;
   generating a traffic list with arrival timestamps for each passenger transition from the first lobby to the second lobby where the traffic list comprises: the timestamp associated with the arrival of the passenger, the floor position data associated with the floor position of the first lobby at a time proximate to when the passenger is detected entering the elevator, and the floor position data associated with the floor position of the second lobby at a time proximate to when the passenger is detected exiting the elevator;
   detecting the position in the first lobby where the passenger was first detected arriving in the lobby; and
   generating information for the passenger transition from the first lobby to the second lobby that comprises the position in the first lobby where the passenger was first detected arriving in the lobby.

2. The method as recited in claim 1, wherein, the time data to establish a timestamp associated with the arrival of the passenger is the time when the passenger is detected entering the elevator.

3. The method as recited in claim 1, wherein the floor position data associated with the floor position of elevator.

4. The method as recited in claim 1, wherein the floor position data associated with the floor position of the elevator is received from a sensor mounted in the elevator.

5. The method as recited in claim 1, wherein tracking each individual passenger is maintained by detecting a head of each individual passenger via at least one of: a circle-Hough transform or particle filtering.

6. The method as recited in claim 1, wherein the generated traffic lists for all elevators in the same group of elevators or in the same building are consolidated into a combined traffic list.

7. The method as recited in claim 1, wherein the generated information for the passenger transition from the first lobby to the second lobby also comprises identification of the elevator.

8. The method as recited in claim 1, wherein the generated information for the passenger transition from the first lobby to the second lobby comprises an amount of time that the passenger spends inside the car between when the passenger is detected entering the elevator and when the passenger is detected existing the elevator.

9. The method as recited in claim 1, further comprising, detecting the first arrival of an individual passenger in a first lobby, wherein the tracking is performed using 3D depth sensor data from one or more sensors mounted inside the first lobby;
   receiving time data associated with the detection of the arrival of the passenger into the first lobby;
   determining the passenger is boarding a particular elevator based on the position of the passenger relative to the known location of each elevator;
   tracking the passenger within the first lobby using 3D depth sensor data from the one or more sensors in the first lobby from when the passenger arrival is detected to when the passenger is detected boarding a particular elevator;
   associating the passenger detected boarding an elevator in the first lobby using the 3D sensor data from one or more sensors in the first lobby with the passenger detected entering the same elevator from the first lobby using 3D sensor data from one or more sensors positioned within the elevator;

generating information for the passenger transition from the first lobby to the second lobby where the time data associated with the arrival of the passenger is the time data associated with the detection of the arrival of the passenger into the first lobby.

10. The method as recited in claim 9, further comprising: associating of one or more passengers detected boarding the elevator in the first lobby using the 3D sensor data from one or more sensors in the first lobby with the passenger detected entering the same elevator from the first lobby using 3D sensor data from one or more sensors positioned within the elevator, which comprises at least one of:
matching the order of passenger boarding an elevator as detected by the 3D sensor data from one or more sensors in the first lobby with the order of passengers entering the same elevator as detected by the 3D sensor data from one or more sensors positioned within the elevator; and
minimizing time difference between the time when a passenger leaves the 3D sensor data from one or more sensors in the first lobby and a passenger enters the 3D sensor data from one or more sensors positioned within the elevator.

11. The method as recited in claim 9, further comprising: associating of one or more passengers detected boarding the elevator in the first lobby using the 3D sensor data from one or more sensors in the first lobby with the passenger detected entering the same elevator from the first lobby using 3D sensor data from one or more sensors positioned within the elevator.

12. The method as recited in claim 9, further comprising: associating of one or more passengers detected boarding the elevator in the first lobby using the 3D sensor data from one or more sensors in the first lobby with the passenger detected entering the same elevator from the first lobby using 3D sensor data from one or more sensors positioned within the elevator so as to minimize a measure of time difference between the time when a passenger leaves the 3D sensor data from one or more sensors in the first lobby and a passenger enters the 3D sensor data from one or more sensors positioned within the elevator.

13. The method as recited in claim 9, further comprising: generating information for the passenger transition from the first lobby to the second lobby that comprises the time when the passenger is detected boarding an elevator.

14. The method as recited in claim 9, further comprising: generating information for the passenger transition from the first lobby to the second lobby that comprises an amount of time the passenger waited in the first lobby between the time of passenger arrival into the first lobby was detected and the time when the passenger is detected boarding an elevator.

15. The method as recited in claim 9, further comprising: detecting the position in the first lobby where the passenger was first detected arriving in the lobby; and
generating information for the passenger transition from the first lobby to the second lobby that comprises the position in the first lobby where the passenger was first detected arriving in the lobby.

16. The method as recited in claim 15, wherein generating information comprises generating a timestamped list of each passenger's transition from the first lobby and second lobby.

17. A method of generating a traffic list comprising:
detecting a passenger entering an elevator from a first lobby using 3D sensor data from one or more sensors positioned within the elevator;
receiving time data to establish a timestamp associated with the arrival of the passenger;
receiving floor position data associated with the floor position of the first lobby at a time proximate to when the passenger is detected entering the elevator;
tracking the passenger movement while within the elevator using 3D depth sensor data from the one or more sensors in the elevator from when the passenger is detected entering the elevator from a first lobby to when the passenger is detected exiting the elevator at a second lobby;
detecting the passenger exiting an elevator to a second lobby using 3D sensor data from one or more sensors positioned within the elevator;
receiving floor position data associated with the floor position of the second lobby at a time proximate to when the passenger is detected exiting the elevator;
generating a traffic list with arrival timestamps for each passenger transition from the first lobby to the second lobby where the traffic list comprises: the timestamp associated with the arrival of the passenger, the floor position data associated with the floor position of the first lobby at a time proximate to when the passenger is detected entering the elevator, and the floor position data associated with the floor position of the second lobby at a time proximate to when the passenger is detected exiting the elevator and further comprising
identifying the specific door that the passenger entered in an elevator that has multiple doors and including the entrance door information in the generated information for the passenger transition.

18. The method as recited in claim 17, further comprising, identifying the specific door that the passenger exited from the elevator that has multiple doors and including the exit door information in the generated information for the passenger transition.

19. A passenger tracking system for tracking a passenger transition from at least one of a first lobby to an elevator from the elevator to a second lobby, comprising:
an elevator movable between a first lobby and a second lobby;
a depth-sensing sensor within the elevator for capturing sensor data wherein the sensor data is 3D depth data;
a processing module in communication with the depth-sensing sensor to receive the sensor data, where the processing module uses the sensor data to perform operations, comprising:
receiving time data to establish a timestamp associated with the arrival of the passenger;
receiving floor position data associated with the floor position of the first lobby at a time proximate to when the passenger is detected entering the elevator;
tracking the passenger movement while within the elevator using 3D depth sensor data from the one or more sensors in the elevator from when the passenger is detected entering the elevator from a first lobby to when the passenger is detected exiting the elevator at a second lobby;
detecting the passenger exiting an elevator to the second lobby using 3D sensor data from one or more sensors positioned within the elevator;
receiving floor position data associated with the floor position of the second lobby at a time proximate to when the passenger is detected exiting the elevator;

associating of one or more passengers detected boarding the elevator in the first lobby using the 3D sensor data from one or more sensors in the first lobby with the passenger detected entering the same elevator from the first lobby using 3D sensor data from one or more sensors positioned within the elevator, which comprises at least one of:
  matching the order of passenger boarding an elevator as detected by the 3D sensor data from one or more sensors in the first lobby with the order of passengers entering the same elevator as detected by the 3D sensor data from one or more sensors positioned within the elevator; and
  minimizing time difference between the time when a passenger leaves the 3D sensor data from one or more sensors in the first lobby and a passenger enters the 3D sensor data from one or more sensors positioned within the elevator; and
generating a traffic list with arrival timestamps for each passenger transition from the first lobby to the second lobby where the traffic list comprises: the timestamp associated with the arrival of the passenger, the floor position data associated with the floor position of the first lobby at a time proximate to when the passenger is detected entering the elevator, and the floor position data associated with the floor position of the second lobby at a time proximate to when the passenger is detected exiting the elevator.

20. The system as recited in claim 19, wherein the processing module is operable to obtain the time data to establish a timestamp associated with the arrival of the passenger is the time when the passenger is detected entering the elevator.

21. The system as recited in claim 20, wherein the time data comprises a first time interval that comprises an amount of time a passenger waits in the first lobby for the elevator to arrive, a second time interval that comprises an amount of time the elevator doors are open, and a third time interval that comprises an amount of time a passenger spends in the elevator.

22. The system as recited in claim 19, wherein the processing module is operable to obtain floor position data associated with the floor position of the elevator from the elevator controller.

23. The system as recited in claim 19, wherein the depth-sensing sensor comprises a structured light measurement, phase shift measurement, time of flight measurement, stereo triangulation device, sheet of light triangulation device, light field cameras, coded aperture cameras, computational imaging techniques, simultaneous localization and mapping (SLAM), imaging radar, imaging sonar, scanning LIDAR, flash LIDAR, Passive Infrared (PIR) sensor, and small Focal Plane Array (FPA), or a combination comprising at least one of the foregoing.

* * * * *